(12) United States Patent
You

(10) Patent No.: US 12,321,886 B2
(45) Date of Patent: Jun. 3, 2025

(54) PET CARE SERVICE SYSTEM AND METHOD BY USING PET MOBILITY

(71) Applicants: Hyundai Motor Company, Seoul (KR); Kia Corporation, Seoul (KR)

(72) Inventor: Hee Jeong You, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 468 days.

(21) Appl. No.: 17/525,598

(22) Filed: Nov. 12, 2021

(65) Prior Publication Data

US 2022/0301091 A1  Sep. 22, 2022

(30) Foreign Application Priority Data

Mar. 22, 2021 (KR) .......................... 10-2021-0036352

(51) Int. Cl.
*G06Q 10/0832* (2023.01)
*A01K 11/00* (2006.01)
(Continued)

(52) U.S. Cl.
CPC ........ *G06Q 10/0832* (2013.01); *A01K 11/008* (2013.01); *A01K 29/005* (2013.01);
(Continued)

(58) Field of Classification Search
CPC .................................................... G06Q 50/40
See application file for complete search history.

(56) References Cited

U.S. PATENT DOCUMENTS

| 9,642,340 B2* | 5/2017 | Brown, Jr. ............ H04L 65/612 |
| 2016/0125356 A1* | 5/2016 | Kellogg ............... A01K 11/006 |
| | | 705/332 |
| 2020/0130702 A1* | 4/2020 | Ferreira ............... B60W 10/30 |

FOREIGN PATENT DOCUMENTS

| CN | 111178796 A | * | 5/2020 |
| KR | 10-2003-0064678 A | | 8/2003 |

(Continued)

OTHER PUBLICATIONS

Gan, Wei, et al. "Design and implementation of pet logistics service system based on the internet of things." 1st International Symposium on Economic Development and Management Innovation (EDMI 2019). Atlantis Press, 2019. (Year: 2019).*

*Primary Examiner* — Emmett K. Walsh
(74) *Attorney, Agent, or Firm* — Fox Rothschild LLP

(57) ABSTRACT

A pet care service system uses pet mobility to provide a pet care service reserved by a user terminal. The system includes a recognizer that obtains pet identification information for identifying a pet by reading an identification device attached to the pet boarding the pet mobility and a camera is provided in the pet mobility to capture the pet and generate a pet image of the pet boarding the pet mobility, and a management server. The management server receives the pet identification information from the recognizer, compares the received pet identification information with pet identification information matched to the user, combines current location information of the pet mobility with a pet image of the pet boarding the pet mobility received from the camera when the received pet identification information and the pet identification information matched to the user are identical, and transmits the combined information to the user terminal.

10 Claims, 17 Drawing Sheets

(51) Int. Cl.
*A01K 29/00* (2006.01)
*G06Q 10/02* (2012.01)
*G06Q 50/40* (2024.01)
*G06V 40/10* (2022.01)

(52) U.S. Cl.
CPC ............. *G06Q 10/02* (2013.01); *G06Q 50/40* (2024.01); *G06V 40/103* (2022.01)

(56) References Cited

FOREIGN PATENT DOCUMENTS

| KR | 10-2014-0014968 A | 2/2014 |
| KR | 101565304 B1 | 11/2015 |
| KR | 101590464 B1 | 2/2016 |
| KR | 101728107 B1 | 4/2017 |
| KR | 10-2018-0123394 A | 11/2018 |
| KR | 10-2019-0050427 A | 5/2019 |
| KR | 101998125 B1 | 7/2019 |
| KR | 102122346 B1 | 6/2020 |
| KR | 10-2020-0078821 A | 7/2020 |
| KR | 10-2020-0109532 A | 9/2020 |

\* cited by examiner

PET CARE SERVICE SYSTEM AND METHOD BY USING PET MOBILITY

CROSS-REFERENCE TO RELATED APPLICATION

This application claims priority to and the benefit of Korean Patent Application No. 10-2021-0036352 filed on Mar. 22, 2021, the entire contents of which are incorporated herein by reference.

TECHNICAL FIELD

The described technology relates generally to a pet care service system and method using pet mobility.

BACKGROUND

For the mobility of pets, there are many restrictions on using general public transportation such as buses, subways, and taxis. There are many situations where it is not possible to ride with a pet, and friction with other occupants occurs. Therefore, many people who raise pets have high needs for pet mobility. Recently, there are basic services such as taxis where you can ride with pets, and pickup services that take pets to a destination. However, there are problems such as inconvenient reservations to use the service or long waiting for the reservation. Although the number of pet households has increased due to the increase in single-person, non-child, and double-income households, there are still many restrictions on moving pets alone or with companions.

The above information disclosed in this section is merely for enhancement of understanding of the background of the invention, and therefore it may contain information that does not form the prior art that is already known in this country to a person of ordinary skill in the art.

SUMMARY

The present invention is to provide a pet care service system and method by using pet mobility which can move a pet alone.

According to an exemplary embodiment of the present invention, a pet care service system using pet mobility to provide a pet care service reserved by a user terminal, may comprise a recognizer configured to obtain pet identification information for identifying a pet by reading an identification device attached to the pet boarding the pet mobility, a camera provided in the pet mobility to capture a photograph or video of the pet to generate a pet image of the pet boarding the pet mobility, and a management server. The management server may be configured to receive the pet identification information from the recognizer, compare the received pet identification information with pet identification information matched to the user, combine current location information of the pet mobility with a pet image of the pet boarding the pet mobility received from the camera when the received pet identification information and the pet identification information matched to the user are identical, and transmit the combined information to the user terminal.

The pet mobility may be configured to transmit the current location information to a vehicle control server, and the management server may be configured to receive the current location information from the vehicle control server.

The management server may be configured to derive environment information necessary to provide an environment suitable for the pet identified from a registered data when the pet identification information matched to the user, and the received pet identification information may be identical at a time which the pet boards the pet mobility, and transmit the derived environmental information to a terminal of the pet mobility. The terminal of the pet mobility may be configured to receive the environment information and adjust the pet mobility according to the environment information.

The recognizer may be a driver terminal of a driver operating the pet mobility, and the pet identification information may be read from the identification device through an app installed in the driver terminal. The recognizer may be a driver terminal of a driver operating the pet mobility, and the pet identification information written in the identification device may be transmitted to the management server through the driver terminal. The pet care service system may further comprise a driver terminal of a driver operating the pet mobility, and at least one of the management servers and the driver terminal receives status information about the pet and information about measures required for the pet from the user terminal.

According to another exemplary embodiment of the present invention, a pet care service method using pet mobility to provide a pet care service reserved by a user terminal, may include reading, by a recognizer, pet identification information of the pet from an identification device attached to the pet when the pet boards the pet mobility, comparing, by a management server, the pet identification information received from the recognizer with the pet identification information matched to the user, receiving, by the management server, a pet image of the pet from a camera installed in the pet mobility pet when the pet identification information received from the recognizer and the pet identification information matched to the user are identical, combining, by the management server, current location information of the pet mobility and the pet image of the pet, and transmitting, by the management server, the combined information to the user terminal.

The pet care service method may further comprise transmitting, by the pet mobility, the current location information to a vehicle control server; and receiving, by the management server, the current location information from the vehicle control server. The pet care service method may further comprise deriving, by the management server, environment information necessary to provide an environment suitable for the pet identified from a registered data when the pet identification information matched to the user and the received pet identification information are identical at a time which the pet boards the pet mobility, and transmitting, by the management server, the derived environmental information to a terminal of the pet mobility.

The pet care service method may further comprise receiving, by the pet mobility terminal, the environment information, and adjusting the pet mobility according to the environment information. The recognizer may be a driver terminal of a driver operating the pet mobility, and the pet care service method may further comprise reading, by an application installed in the driver terminal, the pet identification information from the identification device.

The recognizer may be a driver terminal of a driver operating the pet mobility, and the pet care service method may further comprise receiving, by the management server, the pet identification information written in the identification device from the driver terminal. The recognizer may be a driver terminal of a driver operating the pet mobility, and the pet care service method may further comprise receiving, by the management server, pet status information on the status of the pet and information on necessary measures according to the status of the pet from the user terminal.

According to yet another exemplary embodiment of the present invention, a pet care service method using pet mobility to provide a pet care service reserved by a user terminal may include receiving, by a partner terminal, a pet image of the pet boarding the pet mobility from a management server, transmitting, by the partner terminal, information on the measures when the pet requires the measures, requesting, by the partner terminal, consent to the measures to the user terminal, and transmitting, by the partner terminal, information on the measures to a driver terminal of the pet mobility when the partner terminal receives the consent for the measures from the user terminal.

The pet care service method may further comprise receiving, by the partner terminal, current location information of the pet mobility together with the pet image of the pet from the management server; and estimating, by the partner terminal, an arrival time in consideration of a route between a service partner and the current location of the pet mobility and the traffic condition of the route.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present invention, and wherein.

DETAILED DESCRIPTION

Figure 1:
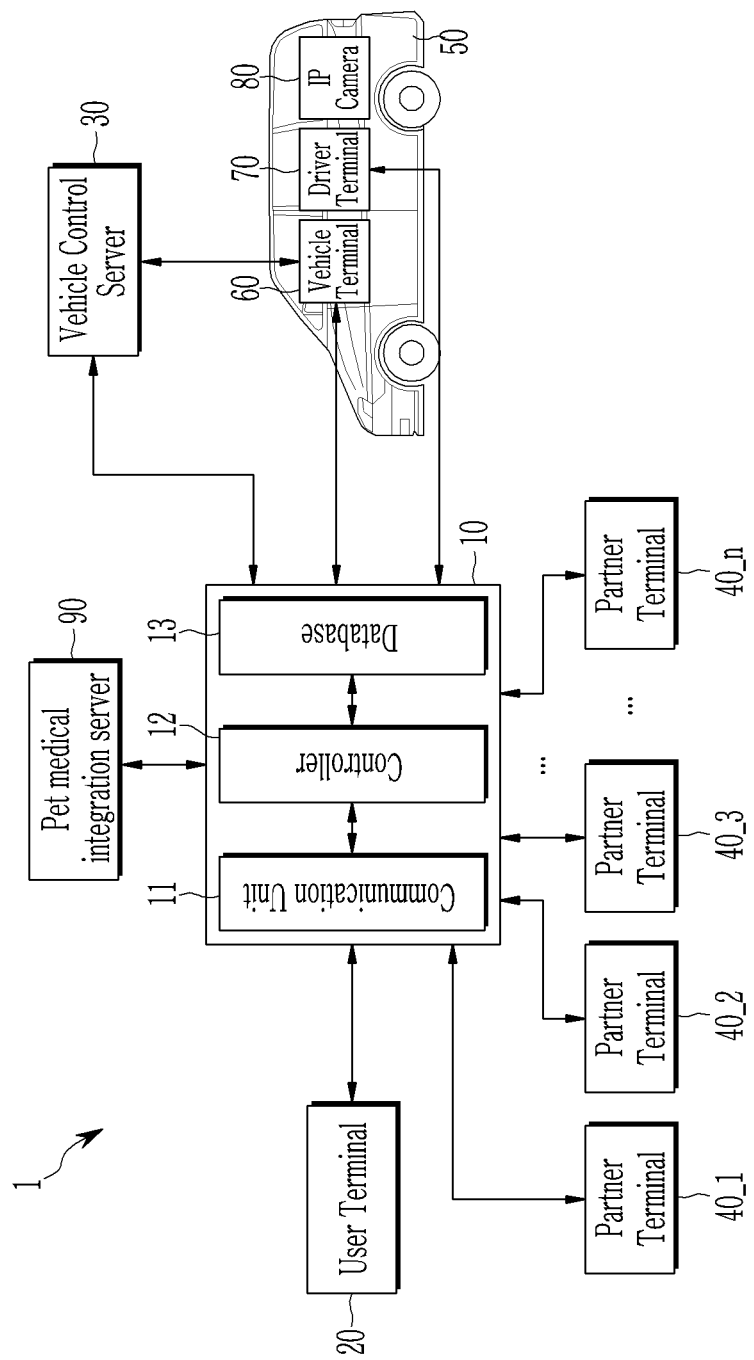
FIG. 1 is a drawing showing a pet care system according to an exemplary embodiment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term control unit/controller refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The present disclosure provides various types of combined mobility solutions through linkage between pet mobility service and pet-only services (hospital, beauty, kindergarten, goods delivery, etc.). For example, the present invention may solve the problem of pet movement through a pet mobility service which can move pet alone, and form and expand the pet mobility market. In the present disclosure, a "pet" is used as a common term for companion animals and is not limited to a particular animal type.

Hereinafter, exemplary embodiments disclosed in the present specification will be described in detail with reference to the accompanying drawings. In the present specification, the same or similar components will be denoted by the same or similar reference numerals, and an overlapped description thereof will be omitted. The terms "module" and "unit" for components used in the following description are used only in order to make the specification easier. Therefore, these terms do not have meanings or roles that distinguish them from each other by themselves. In describing embodiments of the present specification, when it is determined that a detailed description of the well-known art associated with the present invention may obscure the gist of the present invention, it will be omitted. The accompanying drawings are provided only to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like, will be used only to describe various components, and are not to be interpreted as limiting these components. The terms are only used to differentiate one component from other components. It is to be understood that when one component is referred to as being "connected" or "coupled" to another component, it may be connected or coupled directly to another component or be connected or coupled to the other component with another component intervening therebetween. On the other hand, it is to be understood that when one component is referred to as being "connected or coupled directly" to another component, it may be connected to or coupled to the other component without another component intervening therebetween. It will be further understood that terms "comprises" or "have" used in the present specification specifies the presence of stated features, numerals, steps, operations, components, parts, or a combination thereof, but does not preclude the presence or addition of one or more other features, numerals, steps, operations, components, parts, or combinations thereof.

FIG. 1 is a drawing showing a pet care system according to an exemplary embodiment. The pet care system 1 may include a pet care management server (hereinafter, abbreviated as a management server) 10, a user terminal 20, a vehicle control server 30, a plurality of partner terminals (40_1 to 40_n, n is a natural number), a pet mobility 50, a vehicle terminal 60, a driver terminal 70, an IP camera 80, and a pet medical integration server 90. In FIG. 1, a user terminal 20, a vehicle terminal 60, and a driver terminal 70 are only one shown, but this is merely for convenience of description and does not limit the invention.

A plurality of user terminals, a plurality of vehicle terminals, and a plurality of driver terminals may be connected to the pet care management server 10 via wired/wireless communication, and service requests, reservations, and information necessary for execution may be received and transmitted thereto/therefrom. When referring to a specific partner terminal among a plurality of partner terminals 40_1 to 40_n, the specific terminal is referred to as "40_i" (i is one of natural numbers from 1 to n).

As shown in FIG. 1, a management server 10 may include a communication unit 11, a controller 12, and a database 13. A pet care service site for providing a pet care service on the web may be operated through the management server 10. The communication unit 11 may be configured to transmit and receive information for providing a pet care service by performing communication with the outside via a wired or wireless communication network.

The controller 12 may be configured to obtain necessary information for a pet care service based on information received through the communication unit 11, generate necessary information for a pet care service, and transmit the information to the outside through the communication unit 11. The controller 12 may be implemented as a software that performs a function necessary to provide a pet care service or a program including a combination of software, and the program may be stored in a storage medium of the management server 10. Storage medium may be implemented in various types of memory, such as high-speed random access memory, magnetic disk storage devices, flash memory devices, and non-volatile memory, e.g., the other non-volatile solid-state memory devices, etc.

The database 13 may be configured to store the predetermined information for a pet case service, and store the necessary information of the obtained or generated information.

The configuration of the management server 10 as shown in FIG. 1 is only an essential configuration for describing an exemplary embodiment, but is not limited thereto. The operation performed by the management server 10 may be operated by the controller 12, and the controller 12 may be configured to perform necessary operations, judgment, etc. for operation of the management server 10.

Requests for necessary information between each of configurations and information requested in response to the request may be transmitted and received via wired/wireless communication. The wired/wireless communication scheme is not limited in a specific manner, and the communication scheme applied between each configuration may be one of various communication methods currently available. A pet mobility 50 refers to a mobile device for providing a pet care service. In the present disclosure, the pet mobility 50 is implemented as a vehicle, and a vehicle 50 may include a vehicle terminal 60 and a camera 80, etc. A driver terminal 70 refers to a personal terminal capable of wired/wireless communication of a driver operating the vehicle 50. The driver terminal 70 may be a personal terminal such as a laptop, a personal computer, a smart phone, or the like, and an application necessary to provide a pet care service may be installed in the driver terminal 70.

The pet medical integration server 90 may be configured to collect, store, and manage records for the treated pet from the pet hospitals that provide pet medical care. The management server 10 may be configured to receive information about the pet subject to a pet care service requested from the user terminal 20, and request medical records for the pet to the pet medical integration server 90. The pet medical integration server 90 may be configured to derive medical records for the pet in response thereto and transmit the medical records to the management server 10. The management server 10 may be configured to receive medical records and analyze whether there is a restriction in the pet being provided with the pet care service requested from the user terminal 20 based on the medical records. The management server 10 may be configured to transmit, along with a reason, that the pet care service cannot be received to the user terminal 20 when there is a restriction in the pet being provided with the requested service, as a result of the analysis.

The user may be configured to select and reserve a service option and a pet care service for a pet using the user terminal 20. In particular, the user terminal 20 may be a pet-only service terminal or a personal terminal. When the user terminal 20 is a personal terminal such as a laptop, a personal computer, a smart phone, etc., the user may use a pet care service by installing an application on the user terminal 20. The user terminal 20 may be configured to transmit and receive necessary information to and from the management server 10 via wired/wireless communication. Hereinafter, the procedure through the user terminal 20 may be performed through a pet-only service terminal or an application installed in the user terminal 20.

The service option may include a goods delivery service, a pet transport service, and a total service that provides a goods delivery service and a pet transport service together. The pet transport service may include a pet-only transport service and a companion transport service in which at least one passenger accompanies the vehicle along with the pet. The at least one passenger may include the user. The pet care service may include a plurality of categories, and the plurality of categories may include a first category for a daily care that is repeatedly provided daily, a second category for leisure of a pet, a third category related to health of a pet, and the like. The first category may include pet kindergartens, daycare, etc. The second category is a pet hotel, a pet pool, a pet cafe, a pet restaurant, a walk on a river, and a picnic, etc. The third category may include a pet beauty, bathing, medical care, snacks, etc.

When reserving a pet care service through the user terminal 20, the user may select the partner offering the reserved pet care service, the service date/time, the goods to be delivered, and the delivery date/time. At this time, the service date and the delivery date of the goods may be the same. The management server 10 may be configured to obtain information on inventory status of provided goods, service availability, etc. through communication with the partner terminals 40_1 to 40_n in real time, and transmit the requested information to the user terminal 20 when requesting information on the partner from the user terminal 20.

Once the goods delivery reservation from the user terminal 20 is completed, the management server 10 may be configured to determine the optimal path of movement that connects the current location of the vehicle, the location of the goods purchase partner, and the delivery destination where the goods will be delivered, and predict the goods pickup time and delivery time based on the travel route. When the pet transport service reservation from the user terminal 20 is completed, the management server 10 may be configured to determine a travel route for the pet transportation and a time for getting the pet in the vehicle 50 at the departure point of the pet transportation based on traffic situation information between the departure point and the destination (partner company) to perform the pet transportation based on the service reservation time. Hereinafter, getting a pet in a vehicle at a departure point of a pet transportation is defined as a pickup.

When the goods delivery is reserved at the pet pickup time, to purchase goods at a partner company buying goods and arrive at the departure point of the pet transport on the pet pickup time, the management server 10 may be configured to determine a vehicle, a travel route (e.g., a path connecting a current vehicle location, the partner company, and the departure point), and a vehicle departure time for purchasing goods. The management server 10 may be configured to transmit and inform the pet pickup time to the user terminal 20. The management server 10 may be configured to acquire and store the payment method from the user terminal 20. The payment method may be preset prior to payment through the user terminal 20. For example, when a user first uses a pet care service, the user inputs payment information through the user terminal 20, and the management server 10 may be configured to receive and store the payment information from the user terminal 20. The user may update the payment information using the user terminal 20. The management server 10 may be configured to charge for a service reserved according to predetermined payment information or updated payment information.

The management server 10 may be configured to communicate with the partner terminal 40_i providing the requested service and reserve the service. When the management server 10 receives information that the requested service is normally reserved from the partner terminal 40_i, the management server 10 may be configured to transmit the information to the user terminal 20 to inform the user terminal 20 that the requested service has been reserved for the partner.

When the service requested by the partner terminal 40_i is rejected, the management server 10 may be configured to inform that the requested service is rejected and transmit information on an alternative partner to the user terminal 20. Alternatively, when the requested service is rejected, the user may request to the management server 10 the information about the partner that may be an alternative through the user terminal 20, and the management server 10 may be configured to update the validity information for the partners in response to the request and transmit the updated information about the alternative partners to the user terminal 20. The validity information may include information about a reservation time capable of reserving a service provided from a partner.

The management server 10 may be configured to receive the current locations of the waiting vehicles from the vehicle control server 30, select an optimal vehicle from among the waiting vehicles based on the goods purchase partner, the delivery destination, and the information on the departure point and the destination of the pet transportation. The waiting vehicle is a vehicle that is not currently operating, i.e., a vehicle that is not scheduled during a time to perform a reserved pet care service among vehicles under call waiting. If the waiting vehicle is an electric vehicle, the current battery capacity must be greater than that capable of operating to provide the reserved pet care service. The vehicle control server 30 may be configured to check the current location of the vehicle in real time and transmit the current location to the management server 10.

The management server 10 may be configured to predict a travel time based on a travel route between the goods purchase partner and the delivery destination and traffic information such as a traffic situation, etc. In addition, the management server 10 may be configured to predict a travel time based on a travel route between a departure point and a destination of the pet transportation and traffic information such as a traffic situation, etc. When the goods are delivered, the vehicle arrives at the delivery destination, and the vehicle driver may transfer the goods to the user and move to the location indicated by the vehicle control server 30. When a passenger travels along with the pet, or only the pet travels, the vehicle travels to the pet transport destination (service partner) after boarding the vehicle is completed at the departure point of the pet transportation. The passenger may be the user.

For a total service, if the goods delivery is reserved at the time of pickup, the goods may be delivered to the user at the departure point of the pet transportation. In the total service, if the goods delivery is reserved at the time of return pickup, the vehicle may return from the pet transport destination to the pet transport departure point after the service is terminated, and the goods may be delivered to the user. In the pet movement, the IP camera 80 provided in the vehicle may be configured to capture a video of the pet, and the video may be transmitted to the management server 10 via a communication device provided in the IP camera 80. If the vehicle arrives at the service partner, the pet may be handed over to a service provider in the service partner.

The service provider may be configured to transmit a service end time to the management server 10 through the partner terminal 40_i. The management server 10 may be configured to transmit the service end time to the user terminal 20. The user may reserve the pet transport service using the user terminal 20 to move to the next partner, return to the pet transport departure point, or to move to another place after the service termination. Alternatively, the user may reserve the return service together when the pet transport service is reserved. The return service is a service that returns to the pet transport departure point from the pet transport destination (service partner) based on the service end time. In the return, the pet may travel alone or move with the passenger. If the goods delivery and the pet transport service are reserved, the goods delivery time may be designated as a service end time. In particular, the vehicle may be moved from the pet transport departure point to the pet transport destination, and after the pet and the passenger (or pet alone) exit the vehicle, may be moved to the goods purchase partner, and then may be moved to the pet transport destination (service partner) prior to the service end time.

When the management server 10 receives a return service request after service termination from the user terminal 20, the management server 10 may be configured to transmit information on a pet's current location (e.g., pet transport destination), a departure time, and a return destination (e.g., pet transport departure point) to the vehicle control server 30. The vehicle control server 30 may be configured to select a vehicle having a minimum travel time or a shortest travel distance from among the waiting vehicles based on information on the pet's current location, departure time, and return destination.

A driver may inform the vehicle control server 30 that the vehicle may operate for the return service through the driver terminal 70. The vehicle control server 30 may be configured to receive information on a real-time location of the vehicle from the vehicle terminal 60. The driver may receive a goods delivery service, a pet transport service, or a total service from the management server 10 through the driver terminal 70, and may receive information on the location of the goods purchase partner, the pet transport departure point, the pet transport destination, the service reservation time, the goods delivery time, the pickup time, the return pickup time, and the like.

Hereinafter, a pet care service method according to an exemplary embodiment will be described. According to an exemplary embodiment of the present invention, the pet care service is implemented in a plurality of steps performed according to a control instruction to the controller 12 of the management server 10. The management server 10 may be configured to receive information for managing the reserved pet care service, and transmit the information to the outside using the communication unit 11. The information necessary for the controller 12 to generate a control instruction may be stored in the database 13. For convenience of explanation, the performance subject of each step is described as being the management server 10.

Figure 2:
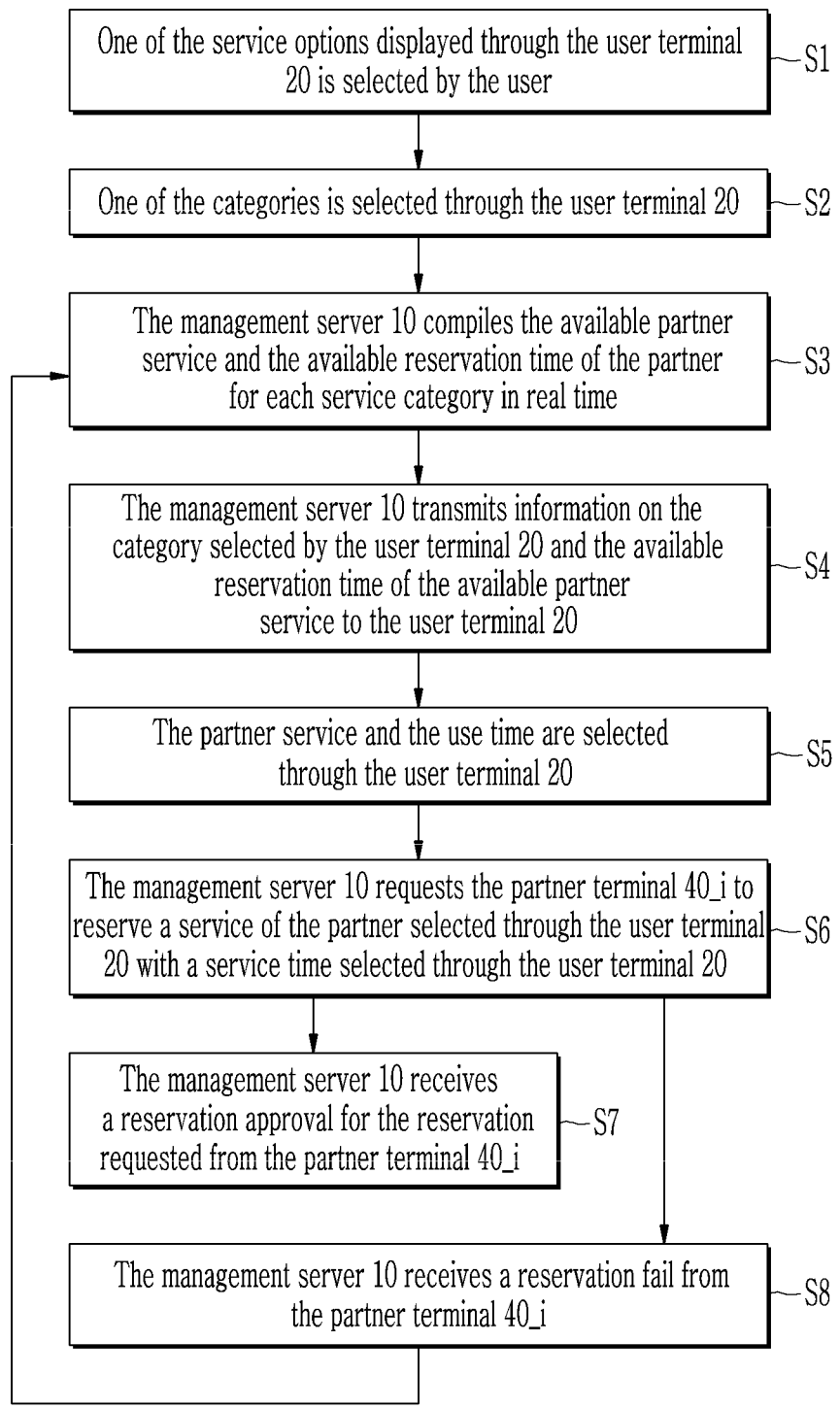
FIG. 2 is a flowchart showing a reservation method for a pet care service according to an exemplary embodiment.

First, a method of reserving a pet care service through the user terminal 20 will be described. FIG. 2 is a flowchart showing a reservation method for a pet care service according to an exemplary embodiment. A service option may be displayed on the user terminal 20, and one of the service options displayed through the user terminal 20 may be selected by the user (S1).

The service option may include a goods delivery service, a pet transport service, and a total service in which the goods delivery service and the pet transport service are combined, but the present disclosure is not limited thereto and other service options may be offered. The pet transport service through the pet mobility may include a service that transports pets only and a companion service that transports pets and passenger together. Information about options selected through the user terminal 20 may be transmitted to the management server 10. Then, a pet care service category may be displayed in the user terminal 20, and one of the categories may be selected through the user terminal 20 (S2). For example, if the selected option is a pet transport service or a total service, a plurality of categories for the pet care service may be displayed. Information for the service category selected through the user terminal 20 may be transmitted to the management server 10.

The management server 10 may be configured to compile the available partner service and the available reservation time of the partner for each service category in real time (S3). The management server 10 may be configured to transmit information on the available partner service belonging to the category selected by the user terminal 20 and the available reservation time of the available partner service to the user terminal 20 (S4). The management server 10 may be configured to check in real time information on services available and current reservation status for each partner by communicating with the partner terminal. The management server 10 may be configured to provide satisfaction level of each partner obtained through a separate evaluation process to the user terminal 20 with the information.

The partner service and the reservation time may be selected through the user terminal 20 (S5). At this time, a pet identification information for identifying the pet which the pet care service is provided may be transmitted to the management server 10 from the user terminal 20. The management server 10 may be configured to request the partner terminal 40_i to reserve a service of the partner selected through the user terminal 20 with the reservation time selected through the user terminal 20 (S6).

The management server 10 may be configured to receive a reservation approval for the reservation requested from the partner terminal 40_i (S7). Alternatively, in response to the request, the management server 10 may be configured to receive a reservation fail from the partner terminal 40_i (S8). At this time, the management server 10 may be configured to re-perform the step S3. After the step S3, the reservation may be approved through the steps S4-S7, or after the step S8, the steps S3-S7 are repeated again. When the user intends to reserve two or more services, above method may be repeated again from the step S1. When the service reservation is approved according to the step S6, the management server 10 may be configured to transmit the reservation confirmation to the user terminal 20.

Figure 3:
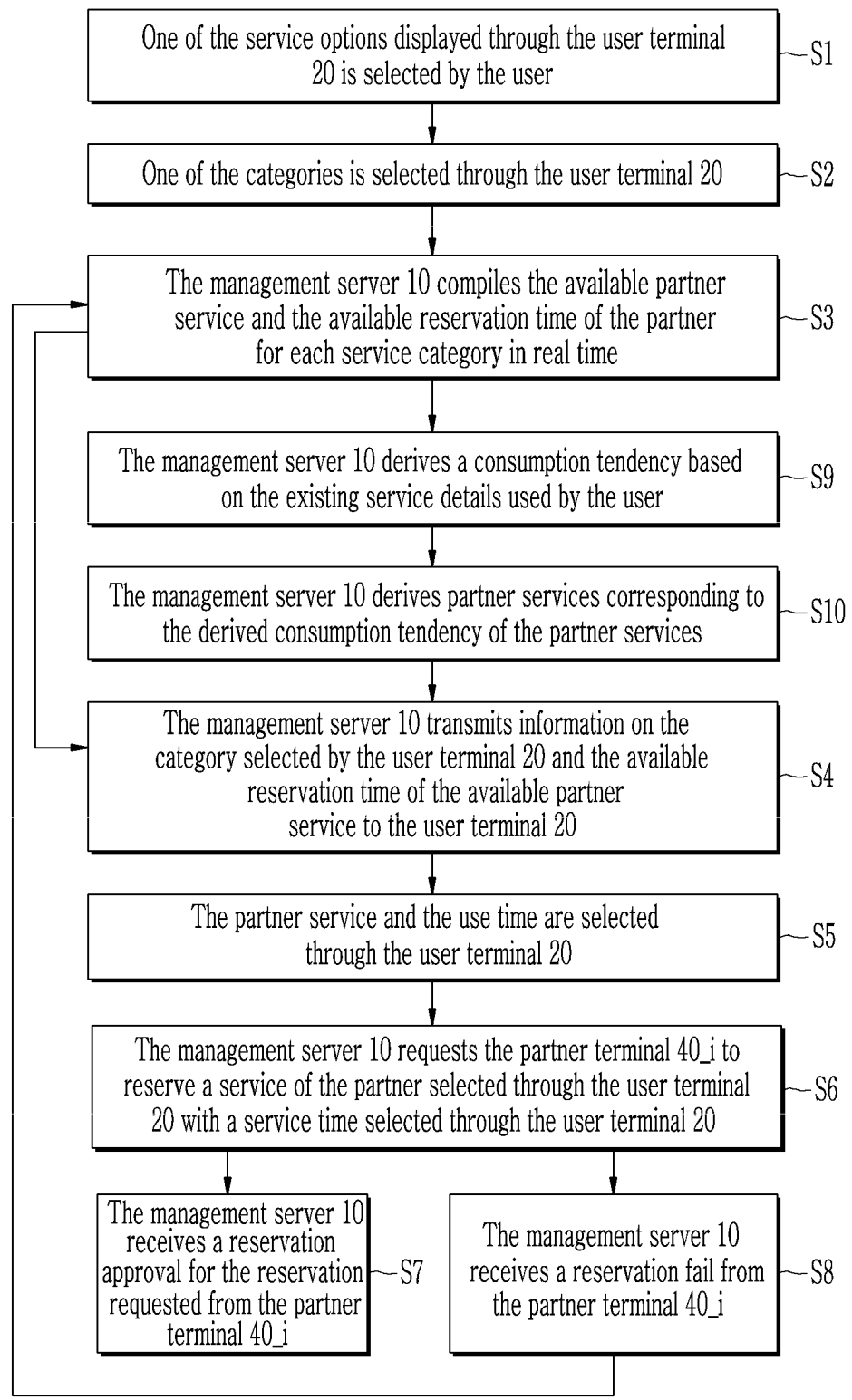
FIG. 3 is a flowchart showing a reservation method for a pet care service according to an exemplary embodiment.

FIG. 3 is a flowchart showing a reservation method for a pet care service according to an exemplary embodiment. The exemplary embodiment shown in FIG. 3 may further include deriving a consumption tendency of a user and recommending a partner service according to the derived consumption tendency by comparing the exemplary embodiment shown in FIG. 2. The same steps as those of the exemplary embodiment shown in FIG. 2 will be omitted.

As shown in FIG. 3, the management server 10 may be configured to derive a consumption tendency based on the existing service details used by the user (S9). The consumption tendency may include a consumption tendency to select a service in consideration of price, a consumption tendency to select a service based on satisfaction of existing users, a consumption tendency to select a travel time or a service of a partner with a close distance, and the like.

The management server 10 may be configured to derive partner services corresponding to the derived consumption tendency of the partner services (S10). The management server 10 may be configured to transmit the available partner service belonging to the category selected by the user terminal 20 among the partner services derived from the step S10 and the available reservation time of the available partner service to the user terminal 20 in the step S4.

Figure 4:
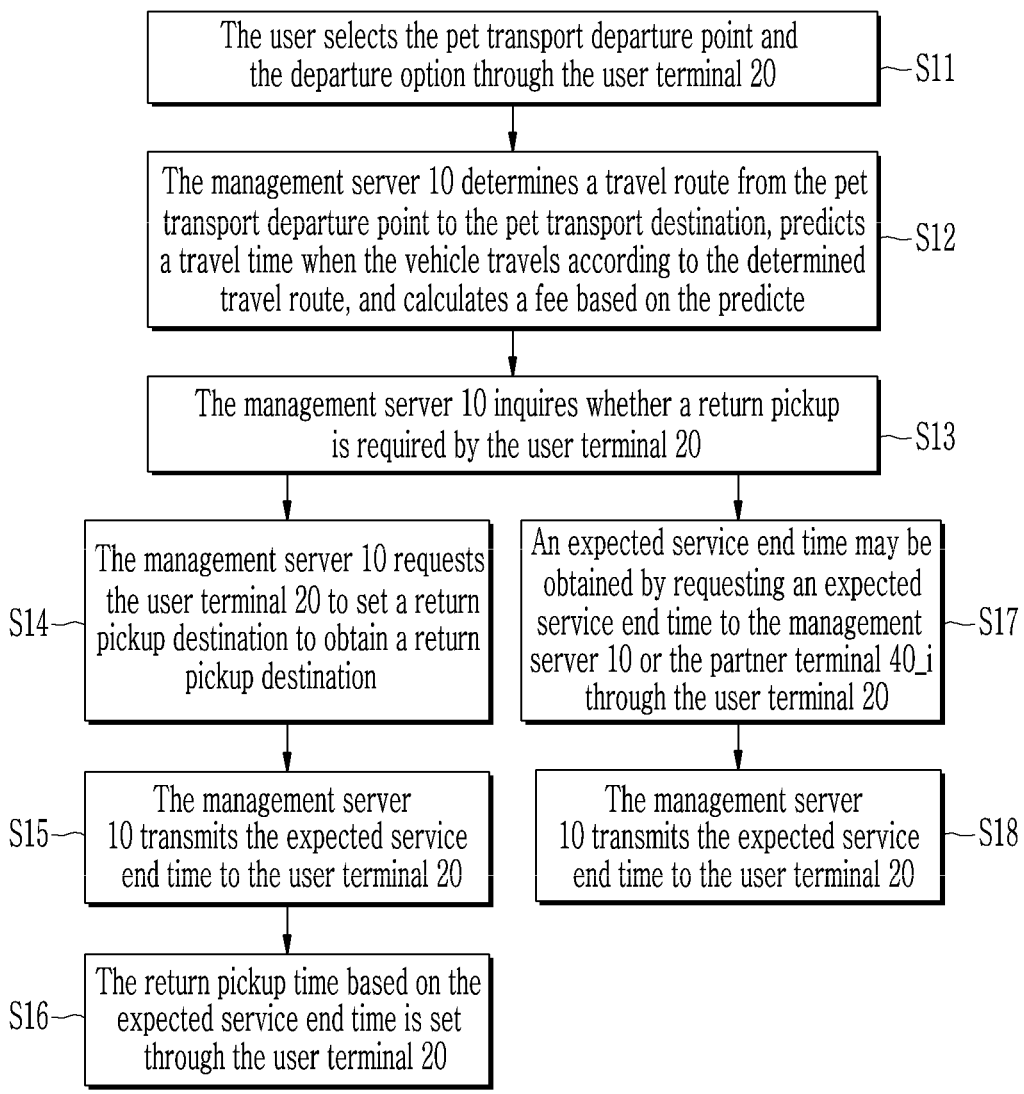
FIG. 4 is a flowchart showing a reservation method for a pet care service according to an exemplary embodiment.

Following the pet care service reservation shown in FIG. 2 or FIG. 3, the steps described with reference to FIG. 4 may be performed. FIG. 4 is a flowchart showing a reservation method for a pet care service according to an exemplary embodiment.

The user may select the pet transport departure point and the departure option through the user terminal 20 (S11). The departure option may include whether the pet travels alone, whether the passenger travels with the pet, or the like. When the pet travels alone, the departure option may include options such as whether the user rides with the pet in the vehicle or whether the vehicle driver directly rides with the pet in the vehicle without the user's assistance. For example, if the departure point is the user's home, the user may transmit the password of the front door lock to the management server 10 through the user terminal 20, and the management server 10 may be configured to transmit the password to the driver terminal 70 to allow the vehicle driver to directly open the front door to enter and take out the pet.

The management server 10 may be configured to determine a travel route from the pet transport departure point to the pet transport destination, predict a travel time when the vehicle travels according to the determined travel route, and calculate a travel cost based on the predicted travel time (S12). The pet transport destination may be the location of the service partner. The management server 10 may be configured to predict a travel time required for the vehicle to arrive at a pet transport destination from a pet transport departure point on the reservation time based on a traffic situation for each day and time. At this time, the management server 10 may be configured to add a time (e.g., about 10 minutes) required for the pet to travel in the vehicle when the pet is traveling alone. The management server 10 may be configured to calculate a travel cost by adding a basic fee of a predetermined amount and a fee according to the predicted travel time. The management server 10 may be configured to add a particular fee to the calculated travel cost when the pet is traveling alone.

The management server 10 may be configured to output an inquiry as to whether a return pickup is required by the user terminal 20 (S13). In other words, if the user did not reserve a return pickup service, the management server 10 may be configured to output a notification requesting whether the user wants the vehicle to transport the pet from the pet transport destination to the pet transport departure point (or other place) after the pet care service is completed. In response to Step S13, when there is a return pickup request, the management server 10 may be configured to request the user terminal 20 to set a return pickup destination to obtain a return pickup destination (S14). In particular, a return pickup destination may be set as the pet transport departure point, and the user may set another place as the return pickup destination through the user terminal 20 instead of the departure point.

The expected service end time may be transmitted to the management server 10 through the partner terminal 40_i. Then, the management server 10 may be configured to transmit the expected service end time to the user terminal 20 (S15). The user may set the return pickup time based on the expected service end time through the user terminal 20 (S16). The user may set any time after the expected service end time to the return pickup time. The set return pickup time may then be transmitted to the management server 10. In response to Step S13, when there is not a return pickup request, the user may apply for a return pickup service later.

When the user additionally requests a return pickup, an expected service end time may be obtained by requesting an expected service end time to the management server 10 or the partner terminal 40_i through the user terminal 20 (S17). If the user and the pet move to the partner together, the user may obtain the service end time directly from the partner. Alternatively, even if the pet travels to a partner alone, the user may directly obtain the expected service end time through a wired/wireless phone call to the service partner.

The user may set the return pickup time based on the destination of the return pickup and the expected service end time while adding the return pickup service through the user terminal 20 (S18). The set return pickup time may then be transmitted to the management server 10. When there is no request for return pickup after step S16 or in response to step S13, a step described with reference to FIG. 5 may proceed.

Figure 5:
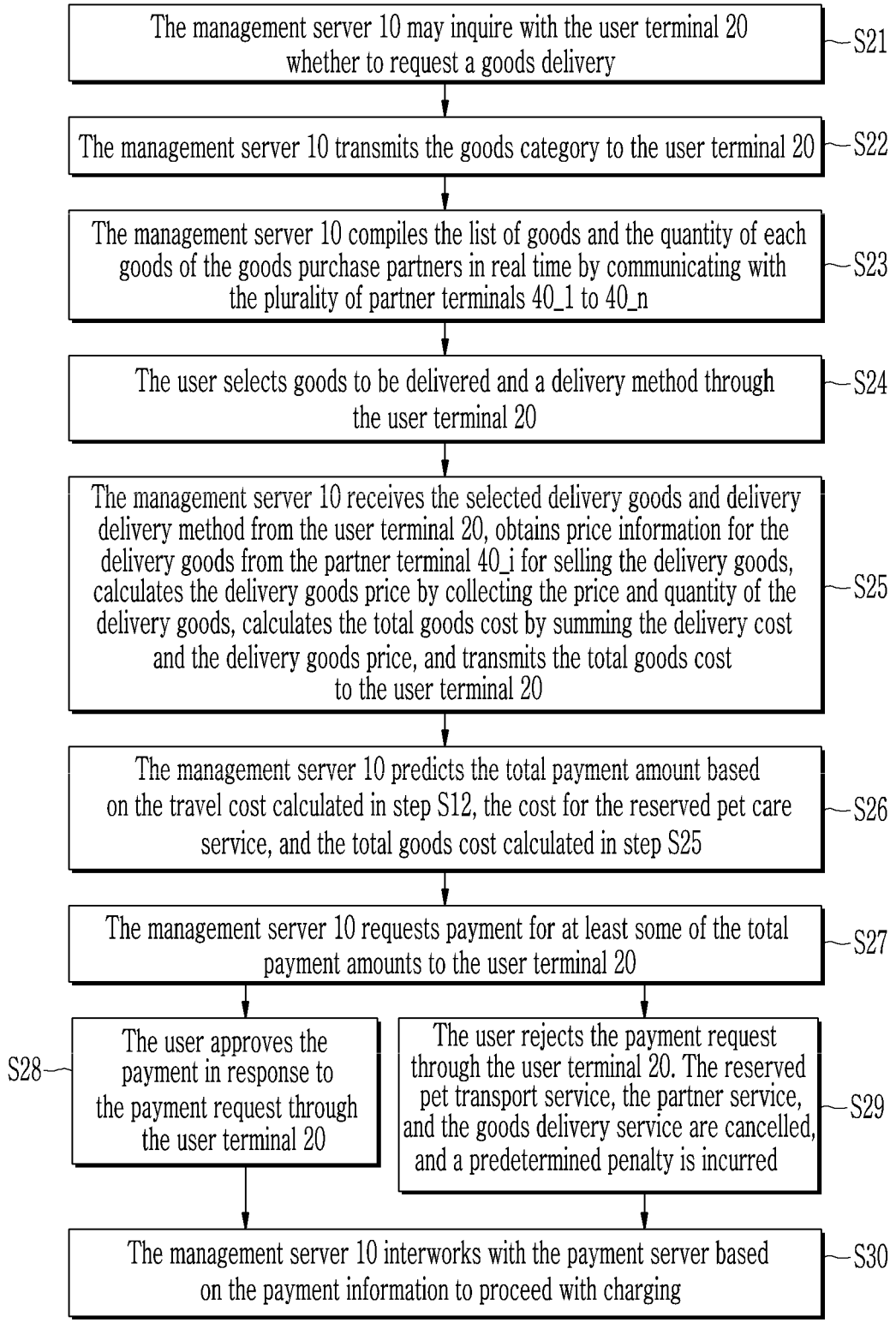
FIG. 5 is a flowchart showing a reservation method for a goods delivery service with a pet transport service according to an exemplary embodiment.

FIG. 5 is a flowchart showing a reservation method for a goods delivery service with a pet transport service according to an exemplary embodiment. The management server 10 may be configured to output an inquiry to the user terminal 20 as to whether to request a goods delivery service (S21). In step S21, when the user requests a goods delivery service through the user terminal 20, the management server 10 may be configured to transmit the goods category to the user terminal 20 (S22). The goods category may include pet foods, pet snacks, hygiene products, and the like.

The management server 10 may be configured to compile a list of goods and a quantity of each good sold by partners in real time by communicating with a plurality of partner terminals 40_1 to 40_n (S23). If a total service is requested, the management server 10 may be configured to separate the goods sold by the pet transport destination partner from the goods sold by the other partners, classify a list of goods and quantity of each good sold by the pet transport destination partner and the lists of goods and quantity of each good sold by the other partners, and transmit them to the user terminal 20.

The user may select goods to be delivered and a delivery method through the user terminal 20 (S24). Delivery methods may include delivery upon pickup and delivery upon return pickup. If the user has reserved only the pickup service, the delivery method may be selected as delivery at pickup. When the user also reserves the return pickup service, either at the time of pickup or at the time of return pickup may be selected. The management server 10 may be configured to receive the selected delivery goods and delivery method from the user terminal 20, obtain price information for the delivery goods from the partner terminal 40_i for selling the delivery goods, calculate the delivery goods price by collecting the price and quantity of the delivery goods, calculate the total goods cost by summing the delivery cost and the delivery goods price, and transmit the total goods cost to the user terminal 20 (S25).

The price policy for the delivery cost may be determined based on the purchase place of the goods and the delivery time of the goods. For example, when a purchase of a goods sold by a partner that provides a reserved pet care service is reserved, and the goods must be delivered at the time of return pickup after the pet care service is terminated, the delivery cost may not be incurred. When a purchase of a goods sold by a partner that provides a reserved pet care service is reserved and the goods needs to be delivered at the time of pickup before the pet care service, delivery cost according to delivery distance may be incurred. When the purchase of goods sold at another partner than the partner that provides the reserved service is reserved, delivery cost according to delivery distance may be incurred regardless of the time of return pickup or pickup. However, the delivery cost may be exempted when the price of the goods exceeds a predetermined amount.

First, the management server 10 may be configured to predict the total payment amount based on the travel cost calculated in step S12, the cost for the reserved pet care service, and the total goods cost calculated in step S25 in step (S26). The management server 10 may be configured to obtain a cost for the reserved pet care service from the partner terminal 40_i. The management server 10 may be configured to request payment for at least some of the total payment amounts to the user terminal 20 (S27). For example, the management server 10 may be configured to request payment for the total goods cost and the cost for the pet care service among the total payment amounts, and request payment for the travel cost when the movement service for the pet is completed to the user terminal 20.

The user may approve the payment in response to the payment request through the user terminal 20 (S28). Alternatively, the user may reject the payment request through the user terminal 20. And then, the reserved pet transport service, the partner service, and the goods delivery service may be cancelled, and a predetermined penalty may be incurred (S29). The management server 10 may be configured to interwork with the payment server based on the payment information to proceed with charging for the amount approved for payment in step S28 or the penalty amount incurred in step S29 (S30). The payment server may be a server of such as a financial company or a credit card company according to the user's payment information. Payment information may be set when a user subscribes to a pet care service through the user terminal 20 or may be changed when a pet care service is reserved.

Figure 6A:
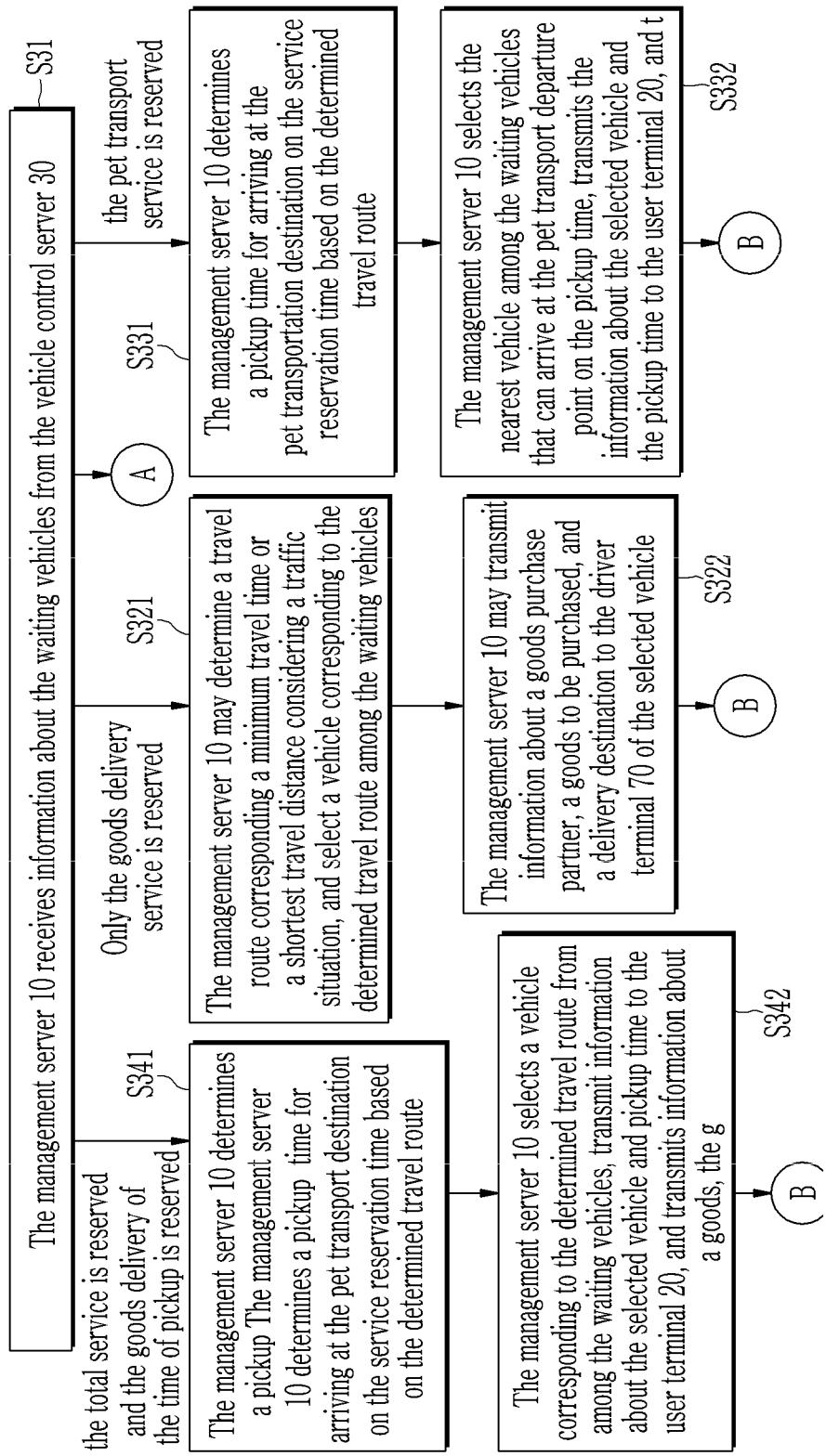
FIG. 6A and FIG. 6B are flowcharts showing a method of determining a travel route and a vehicle according to an exemplary embodiment.
Figure 6B:
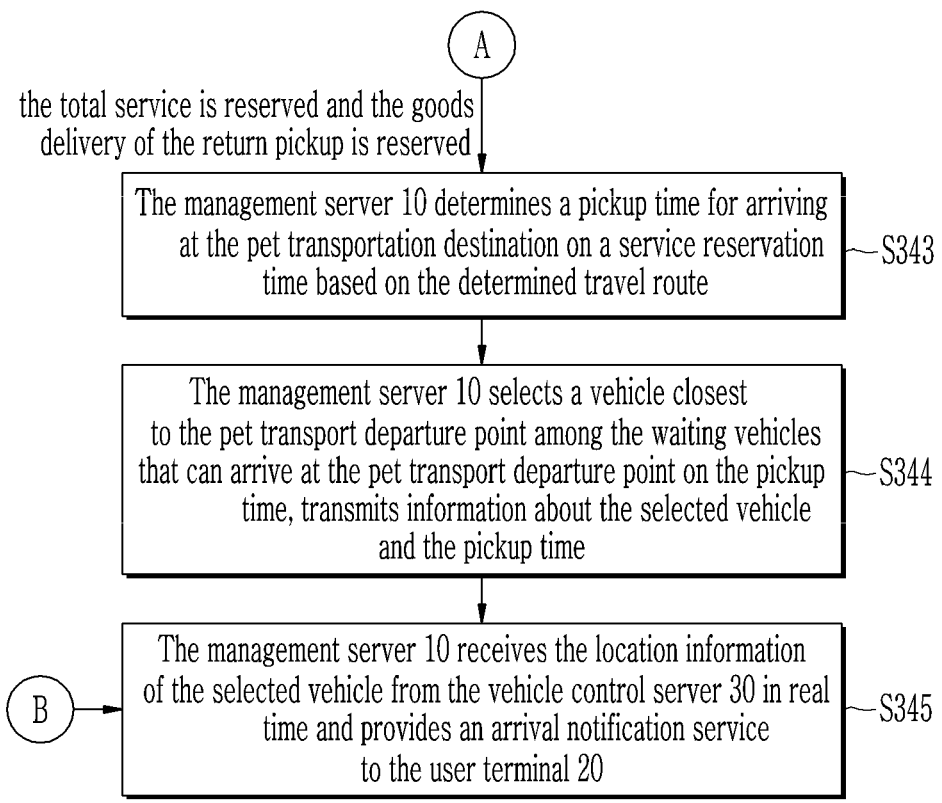

After step S30 or if the user does not request the goods delivery service through the user terminal 20 in step S21, the steps described with reference to FIG. 6A and FIG. 6B may proceed. FIG. 6A and FIG. 6B are flowcharts showing a travel route and a method of determining a vehicle according to an exemplary embodiment. The management server 10 may be configured to receive information about the waiting vehicles from the vehicle control server 30 (S31). The information about the vehicle includes driver information such as the driver's name, photo, and phone number of the driver terminal.

The management server 10 may be configured to select a vehicle having a minimum travel time or a shortest travel distance among the waiting vehicles based on information such as the current locations of the waiting vehicles, the location of a goods purchase partner, the delivery destination, the pet transport departure point and destination, the service reservation time, and the return pickup time, and determine the pickup time in the case of the pet transport service and the total service.

For example, if only the goods delivery service is reserved, the management server 10 may be configured to determine a travel route corresponding a minimum travel time or a shortest travel distance considering a traffic situation, and select a vehicle corresponding to the determined travel route among the waiting vehicles (S321). The management server 10 may be configured to transmit information about a goods purchase partner, a goods to be purchased, and a delivery destination to the driver terminal 70 of the selected vehicle (S322). If necessary, the management server 10 may be configured to transmit information about the selected vehicle to the user terminal 20.

When the pet transport service is reserved, the management server 10 may be configured to determine a travel route corresponding to the minimum travel time or a shortest travel distance considering the traffic situation of the service reservation time zone among the plurality of travel routes between the pet transport departure point and the pet transport destination. The management server 10 may be configured to determine a pickup time for arriving at the pet transportation destination on the service reservation time based on the determined travel route (S331). The service reservation time zone refers to a time period from a predetermined time point prior to the service reservation time to the service reservation time, and the predetermined time may be set according to a traffic situation of the service reservation date and time. For example, as the traffic congestion is severe at the service reservation time, the predetermined time may be increased.

The management server 10 may be configured to select a nearest vehicle among the waiting vehicles capable of arriving at the pet transport departure point on the pickup time, transmit the information about the selected vehicle and the pickup time to the user terminal 20, and transmit information about the pickup time, the pet transport departure point and destination to the driver terminal 70 of the selected vehicle (S332).

When the total service is reserved and the goods delivery of the time of pickup is reserved, the management server 10 may be configured to determine a travel route corresponding to the minimum travel time or the shortest travel distance based on the traffic situation of the service reservation time zone among the plurality of travel routes between the location of the goods purchase partner and the pet transportation destination via the pet transportation departure point. At this time, each of the plurality of travel routes is a path where the vehicle moves in the order of a current vehicle location, a goods purchase partner, a delivery destination (e.g., pet transport departure point), and a pet transport destination. The management server 10 may be configured to determine a pickup time for arriving at the pet transport destination on the service reservation time based on the determined travel route (S341).

The management server 10 may be configured to determine a travel route corresponding to a minimum travel time or a shortest travel distance considering a traffic situation of the pickup time zone, for each of a plurality of travel routes between the current locations of the waiting vehicles, the goods purchase partner, and the pet transport departure point and the pet transport destination. The management server 10 may be configured to select a vehicle corresponding to the determined travel route from among the waiting vehicles, transmit information about the selected vehicle and pickup time to the user terminal 20, and transmit information about a goods, the goods purchase partner, the pickup time, and the pet transport departure point and destination to the driver terminal 70 of the selected vehicle (S342). The pickup time zone refers to a time period from a predetermined time point prior to a pickup time to the pickup time, and the predetermined time may be set according to a traffic condition of the service reservation date and the pickup time.

For example, when the traffic congestion is severe at the pickup time, the predetermined time may be increased. When the total service is reserved and the goods delivery of the return pickup is reserved, the management server 10 may be configured to determine a travel route corresponding to the minimum travel time or the shortest travel distance based on the traffic situation of the service reservation time zone among the plurality of travel routes between the pet transport departure point and the pet transport destination. The management server 10 may be configured to determine a pickup time for arriving at the pet transportation destination on a service reservation time based on the determined travel route (S343).

The management server 10 may be configured to select a vehicle closest to the pet transport departure point among the waiting vehicles capable of arriving at the pet transport departure point on the pickup time, transmit information about the selected vehicle and the pickup time to the user terminal 20, and transmit information about the pickup time, the pet transport departure point and destination, the goods to be delivered, and the goods purchase partner to the driver terminal 70 of the selected vehicle (S344). When the goods delivery is performed at the time of return pickup, the vehicle may travel to the goods purchase partner during the period in which the service is provided to the pet, and return to the service partner that is the pet transport destination. Accordingly, in this case, the management server 10 may not determine a travel route for delivery of the goods.

The management server 10 may be configured to receive the location information of the selected vehicle from the vehicle control server 30 in real time and provide an arrival notification service to the user terminal 20 (S345). The management server 10 may be configured to inform the user terminal 20 of at least one time arrival notification to before the vehicle arrives at the pet transport departure point. For example, the vehicle may be configured to inform the user terminal 20 of arrival notifications before about 30 and 10 minutes before the vehicle arrives at the pet transport departure point.

Figure 7:
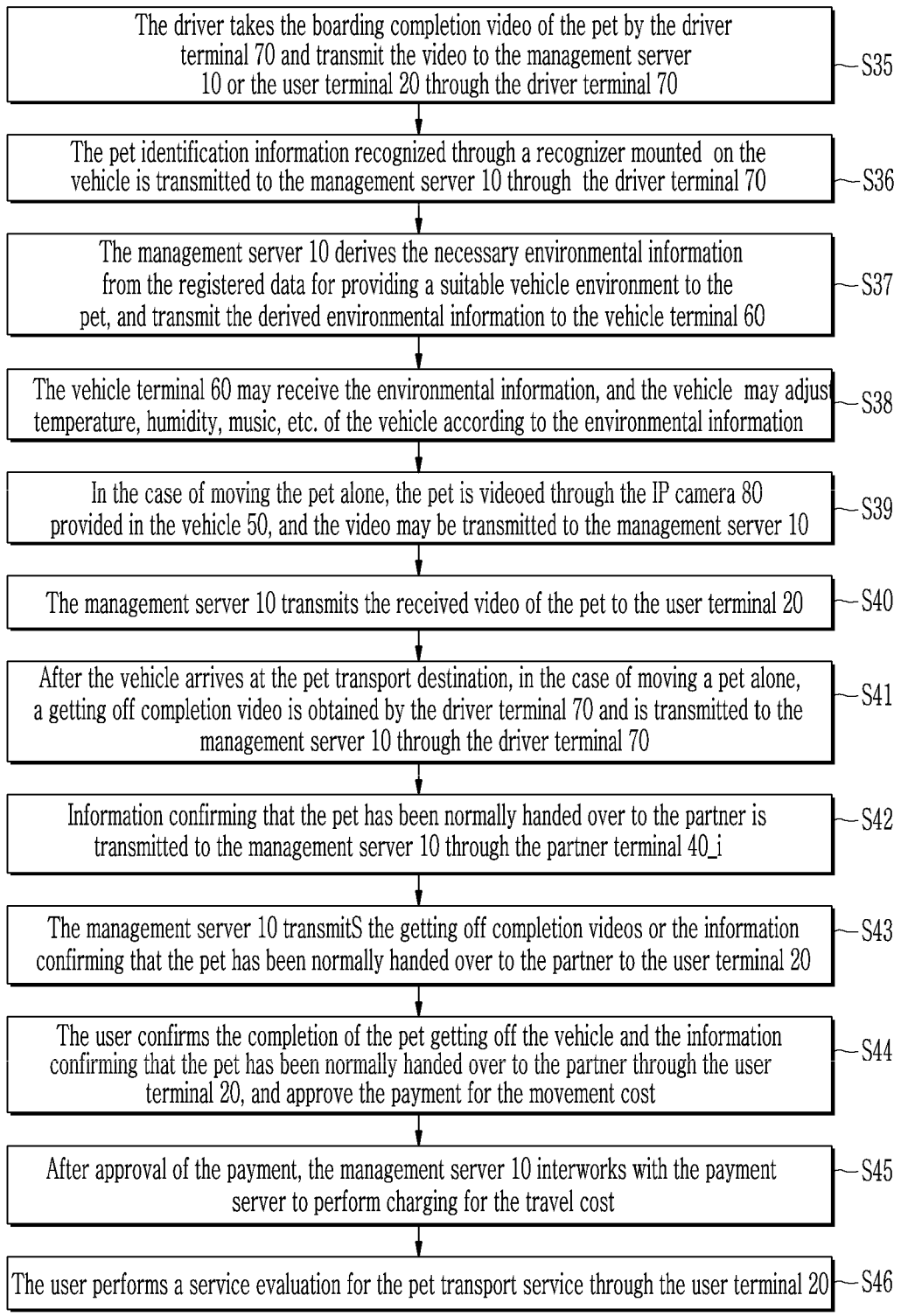
FIG. 7 is a flowchart showing a movement method using a vehicle according to an exemplary embodiment.

FIG. 7 is a flowchart showing a movement method using a vehicle according to an exemplary embodiment. When the goods delivery service of the time of pickup is reserved, the vehicle arrives at the pet transport departure point and the goods delivery may be achieved. After the vehicle arrives at the pet transport departure point, a pet and a passenger or only a pet may board the vehicle. After boarding is complete, the vehicle may travel to the pet transport destination.

When the pet is traveling alone, the driver may take the boarding completion photographs or video of the pet via the driver terminal 70 and transmit the photographs or video to the management server 10 or the user terminal 20 via the driver terminal 70 (S35). When the photographs or video are transmitted to the management server 10 via the driver terminal 70, the management server 10 may be configured to transmit the photographs or video to the user terminal 20.

Additionally, an identification device may be assigned to the pet, and a pet identification information for identifying the pet may be recorded in the identification device. The pet identification information recorded in the identification device may be pre-registered in the management server 10 through the user terminal 20. The pet identification information recognized using a recognizer mounted on the vehicle may be transmitted to the management server 10 through the driver terminal 70 (S36). The identification device and the recognizer may be implemented by a non-tagging method such as NFC, a QR code, a bar code, and Bluetooth. Alternatively, the identification device may be attached to a portion of the body of the pet, a serial number is described on the identification device, and instead of the recognizer, the driver terminal 70 may recognize the serial number described in the identification device.

The management server 10 may be configured to identify a pet that has boarded the vehicle based on the received pet identification information and check whether the pet for which the pet care service is reserved is correct. If the pet for which the pet care service is reserved is correct, the management server 10 may be configured to derive the necessary environmental information from the registered data for providing a suitable vehicle environment to the pet, and transmit the derived environmental information to the vehicle terminal 60 (S37). The environmental information may include information about a suitable temperature, humidity, music, etc. depending on the type of the pet.

The vehicle terminal 60 may be configured to receive the environmental information, and the vehicle may be configured to adjust temperature, humidity, music, etc. of the vehicle according to the environmental information (S38). When the pet is traveling alone, the pet may be videoed using the IP camera 80 provided in the vehicle 50, and the photographs or video may be transmitted to the management server 10 (S39). The management server 10 may be configured to transmit the received photographs or video of the pet to the user terminal 20 (S40). The management server 10 may be configured to store the received photographs or video of the pet for a predetermined time.

After the vehicle arrives at the pet transport destination, when a pet is traveling alone, an exit completion photographs or video may be obtained by the driver terminal 70. The vehicle driver may take pictures of a pet exiting the vehicle and being handed over to a service provider in the partner using the driver terminal 70 to obtain the exit completion photographs or video. The exit completion photographs or video may be transmitted to the management server 10 through the driver terminal 70 (S41). In addition, information confirming that the pet has been normally handed over to the partner may be transmitted to the management server 10 through the partner terminal 40_i (S42). The management server 10 may be configured to transmit the exit completion photographs or videos, or the information confirming that the pet has been normally handed over to the partner to the user terminal 20 (S43). The user may confirm the completion of the pet exiting the vehicle and the information confirming that the pet has been normally handed over to the partner through the user terminal 20, and approve the payment for the travel cost (S44). Since there may be a difference between the actual travel cost and the travel cost calculated in step S12, payment for the travel cost may be made after the exit is completed. After approval of the payment, the management server 10 may be configured to interwork with the payment server to perform charging for the travel cost (S45).

When the user travels with the pet, unnecessary partial operating of steps S35 and S39-S45 may be omitted, and the user may directly pay the travel cost when exiting the vehicle without using the user terminal 20. The user may perform a service evaluation for the pet transport service through the user terminal 20 (S46). The service evaluation item may include an evaluation of driver service, an evaluation of a service provided through a vehicle, and other service evaluation comments.

Figure 8:
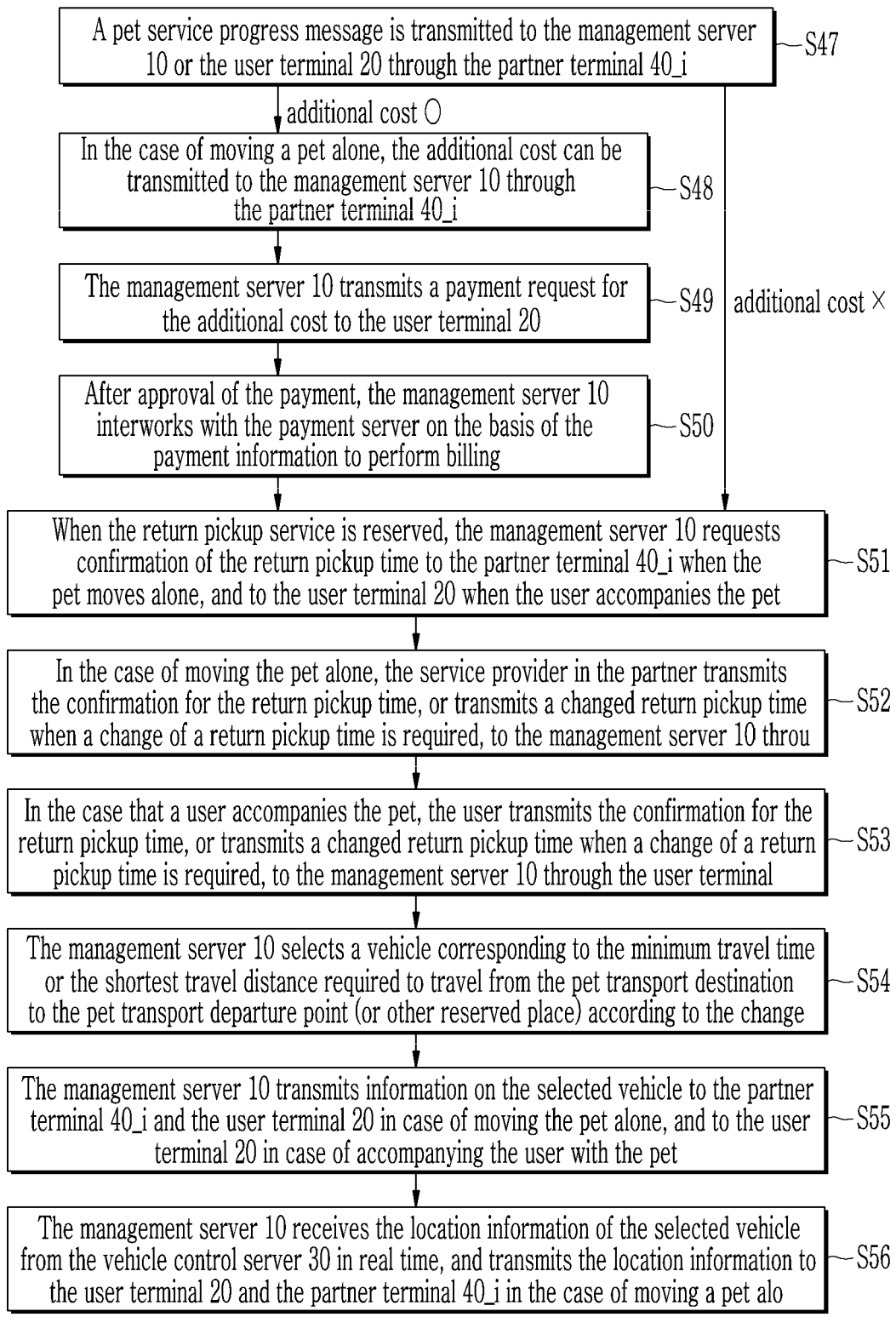
FIG. 8 and FIG. 9 are flowcharts for a return pickup service after a pickup service.
Figure 9:
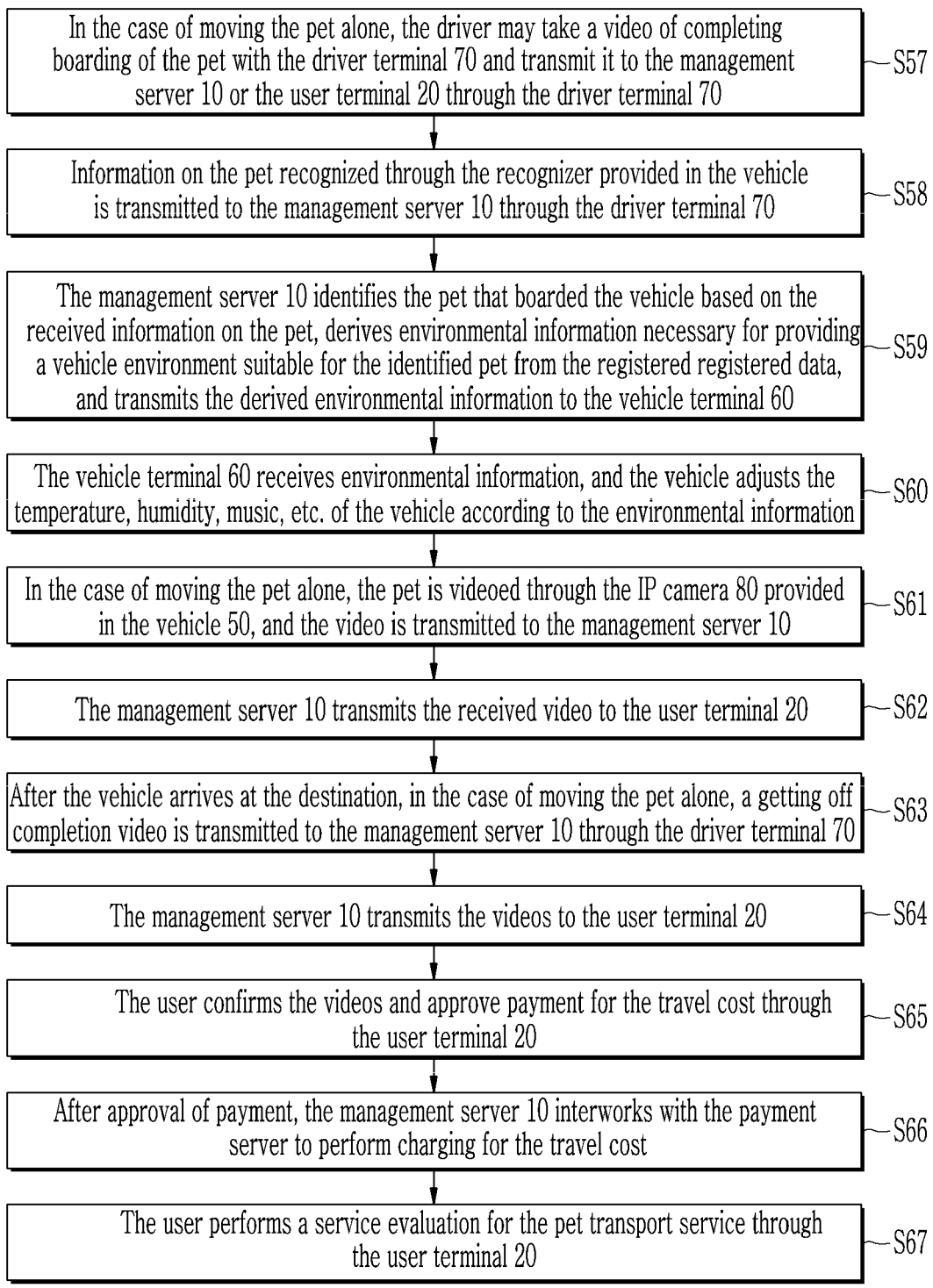

The return pickup service will be described with reference to FIGS. 8 and 9. FIG. 8 and FIG. 9 are flowcharts for a return pickup service after a service in the partner is completed. The service provider in the partner proceeds with the reserved service after receiving the pet. In this time, a pet service progress message may be transmitted to the management server 10 or the user terminal 20 through the partner terminal 40_i (S47). When the management server 10 receives a message about the service progress, the management server 10 may be configured to transmit the message to the user terminal 20.

When a pet is traveling alone, after the service is terminated, if an additional cost is incurred in addition to the service cost expected in step S26, the service provider in the partner may be configured to calculate the service additional cost, and the additional cost may be transmitted to the management server 10 through the partner terminal 40_i (S48). The management server 10 may be configured to transmit a payment request for the additional cost to the user terminal 20 (S49). When the user terminal 20 approves the payment, the management server 10 may be configured to interwork with the payment server based on the payment information to perform billing (S50). When the user accompanies a pet, the user may pay an additional cost directly from the partner.

When the return pickup service is reserved, the management server 10 may be configured to request confirmation of the return pickup time to the partner terminal 40_i when the pet travels alone, and to the user terminal 20 when the user accompanies the pet (S51). When the pet travels alone, the service provider in the partner may be configured to transmit the confirmation for the return pickup time, or transmit a changed return pickup time when a change of a return pickup time is required, to the management server 10 through the partner terminal 40_i (S52).

When a user accompanies the pet, the user may transmit the confirmation for the return pickup time, or transmit a changed return pickup time when a change of a return pickup time is required, to the management server 10 through the user terminal 20 (S53). The management server 10 may be configured to select a vehicle corresponding to the minimum travel time or the shortest travel distance required to travel from the pet transport destination to the pet transport departure point (or other reserved place) according to the changed return pickup time among waiting vehicles. (S54). If the return pickup time is not changed, the vehicle of the pickup may be used for the return pickup service.

The management server 10 may be configured to transmit information on the selected vehicle to the partner terminal 40_i and the user terminal 20 when the pet is traveling alone, and to the user terminal 20 when the user is accompanying the pet (S55). In particular, the management server 10 may be configured to predict a travel cost based on the distance between the departure point and the destination and traffic condition information, and transmit information about the predicted travel cost to the user terminal 20 together with the information on the selected vehicle. The management server 10 may be configured to receive the location information of the selected vehicle from the vehicle control server 30 in real time, and transmit the location information to the user terminal 20 and the partner terminal 40_i when a pet is traveling alone or to the user terminal 20 when a pet is traveling with the user. (S56).

After the vehicle arrives at the pet transport destination, pets and users or only pets may board the vehicle. After boarding is complete, the vehicle may travel to the pet transport departure point (or other reserved place). When the pet travels alone, the driver may take a photographs or video of completing boarding of the pet with the driver terminal 70 and transmit the photographs or video to the management server 10 or the user terminal 20 through the driver terminal 70 (S57). When the completing boarding photographs or video is transmitted to the management server 10 through the driver terminal 70, the management server 10 may be configured to transmit the completing boarding photographs or video to the user terminal 20.

Information on the pet recognized through the recognizer provided in the vehicle may be transmitted to the management server 10 through the driver terminal 70 (S58). The management server 10 may be configured to identify the pet that has boarded the vehicle based on the received information on the pet, derive environmental information necessary for providing a vehicle environment suitable for the identified pet from the registered data, and transmit the derived environmental information to the vehicle terminal 60 (S59). The environmental information may include information on suitable temperature, humidity, music, etc. according to the type of pet. The vehicle terminal 60 may be configured to receive environmental information, and the vehicle may be configured to adjust the temperature, humidity, music, etc. of the vehicle according to the environmental information (S60).

When the travels pet alone, the pet may be videoed using the IP camera 80 provided in the vehicle 50, and the photographs or video may be transmitted to the management server 10 (S61). The management server 10 may be configured to transmit the received photographs or video to the user terminal 20 (S62). In particular, the management server 10 may be configured to store the received photographs or video for a predetermined time. After the vehicle arrives at the destination (for example, the pet transport departure point), when the pet is traveling alone, an exit completion photographs or video may be obtained by the driver terminal 70. The vehicle driver may take pictures of a pet exiting the vehicle and the arrival and entry of the pet transport departure point (or other reserved place) by using the driver terminal 70 to obtain the exit completion photographs or video. The exit completion photographs or video may be transmitted to the management server 10 through the driver terminal 70 (S63).

The management server 10 may be configured to transmit the photographs or videos to the user terminal 20 (S64). The user may confirm the photographs or videos and approve payment for the travel cost through the user terminal 20 (S65). After approval of payment, the management server 10 may be configured to interwork with the payment server to perform charging for the travel cost (S66). When the user travels with the pet, unnecessary partial operating of steps S57 and S61-S64 are omitted, and the user may directly pay the travel cost when getting off without using the user terminal 20.

The user may perform a service evaluation for the pet transport service through the user terminal 20 (S67). The service evaluation item may include an evaluation of driver service, an evaluation of a service provided through a vehicle, and other service evaluation comments. The user may reserve a goods delivery service together with a pet transport service through the user terminal 20. In particular, the user may reserve a goods delivery through the user terminal 20. A goods delivery may be performed at the pet transport departure point or pet transport destination for moving the pet to the partner:

1) goods are purchased before the pet is picked up, and goods are delivered to the pet transport departure point,
2) the goods are purchased while the service is provided to the pet after arriving at the partner through the pet transport service, and goods are delivered to the pet transport departure point at the time of pet return pickup, or
3) when transporting a pet with a passenger, the goods are purchased while the service is provided to the pet after arriving at the partner through the pet transporting service, and the goods may be delivered to the partner.

Figure 10:
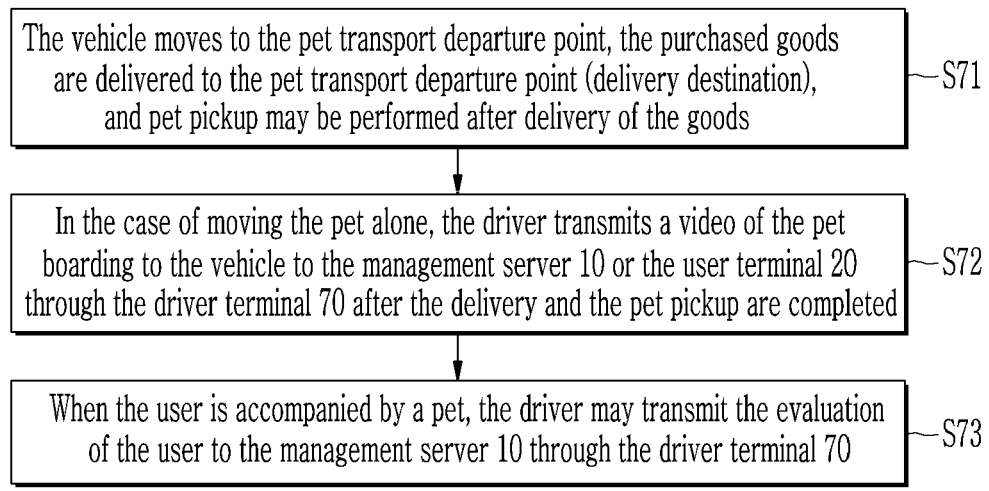
FIG. 10 is a flowchart for a total service in case goods are delivered to a departure point of a pet transport according to an exemplary embodiment.

FIG. 10 is a flowchart for a total service in case goods are delivered from a departure point of a pet transport according to an exemplary embodiment. In FIG. 6A, the total service method after step S342 is described with reference to FIG. 10. The driver operates the vehicle, travels to a goods purchase partner, and purchases goods. The vehicle travels to the pet transport departure point, the purchased goods are delivered to the pet transport departure point (delivery destination), and pet pickup may be performed after delivery of the goods (S71). Step S345 may proceed together with step S71.

After the delivery and the pet pickup are completed, the driver may inform the management server 10 of the delivery and pet pickup completion through the driver terminal 70. When the pet is traveling alone, the driver may transmit a photographs or video of completing boarding of the pet to the management server 10 or the user terminal 20 through the driver terminal 70 after the delivery and the pet pickup are completed (S72). The following service method is omitted because it overlaps with the above-described embodiments. Additionally, when the user is accompanied by a pet, the driver may transmit the evaluation of the user to the management server 10 through the driver terminal 70 (S73).

Figure 11:
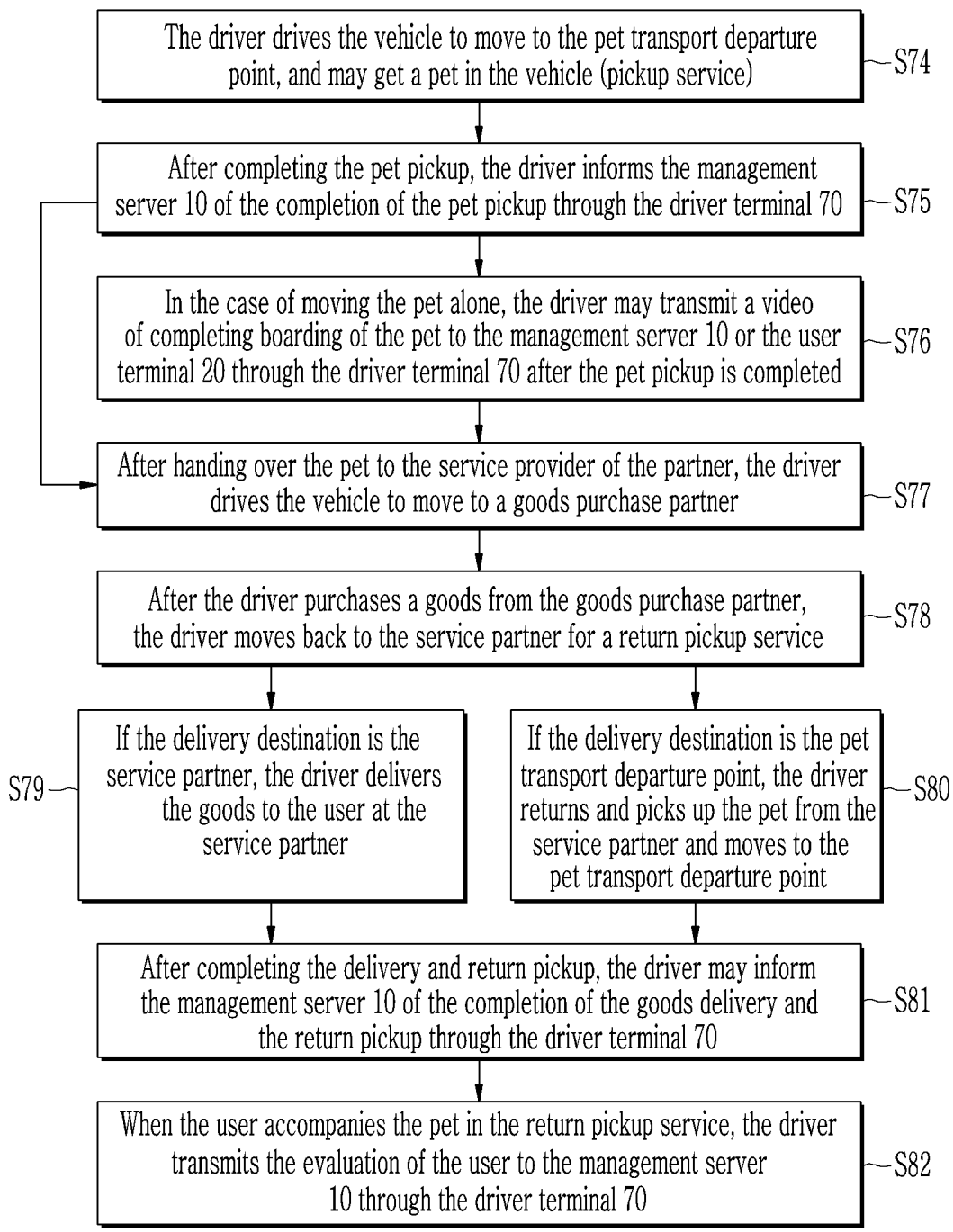
FIG. 11 is a flowchart for a total service in case goods are delivered to a departure point of a pet transport at the time of a pet return pickup according to an exemplary embodiment.

FIG. 11 is a flowchart for a total service in case goods are delivered to a pet transport departure point at the time of a pet return pickup according to an exemplary embodiment. In FIG. 6B, the total service method after steps S343-S345 is described with reference to FIG. 11. The driver drives the vehicle to move to the pet transport departure point, and may get a pet in the vehicle (pickup service) (S74).

After completing the pet pickup, the driver may inform the management server 10 of the completion of the pet pickup through the driver terminal 70 (S75). When the pet is traveling alone, the driver may transmit a photographs or video of completing boarding of the pet to the management server 10 or the user terminal 20 through the driver terminal 70 after the pet pickup is completed (S76). The driver drives the vehicle to move to the pet transport destination, and hands over the pet to the service provider of the partner. Then, the driver may drive the vehicle to move to a goods purchase partner (S77).

After the driver purchases a goods from the goods purchase partner, the driver may move back to the service partner for a return pickup service (S78). If the delivery destination is the service partner, the driver may deliver the goods to the user at the service partner (S79). If the delivery destination is the pet transport departure point, the driver may return and pick up the pet from the service partner and move to the pet transport departure point (S80).

After completing the delivery and return pickup, the driver may inform the management server 10 of the completion of the goods delivery and the return pickup through the driver terminal 70 (S81). Additionally, when the user accompanies the pet in the return pickup service, the driver may transmit the evaluation of the user to the management server 10 through the driver terminal 70 (S82).

The following embodiments may be applied to the embodiments of the above-described pet-only movement.

Figure 12:
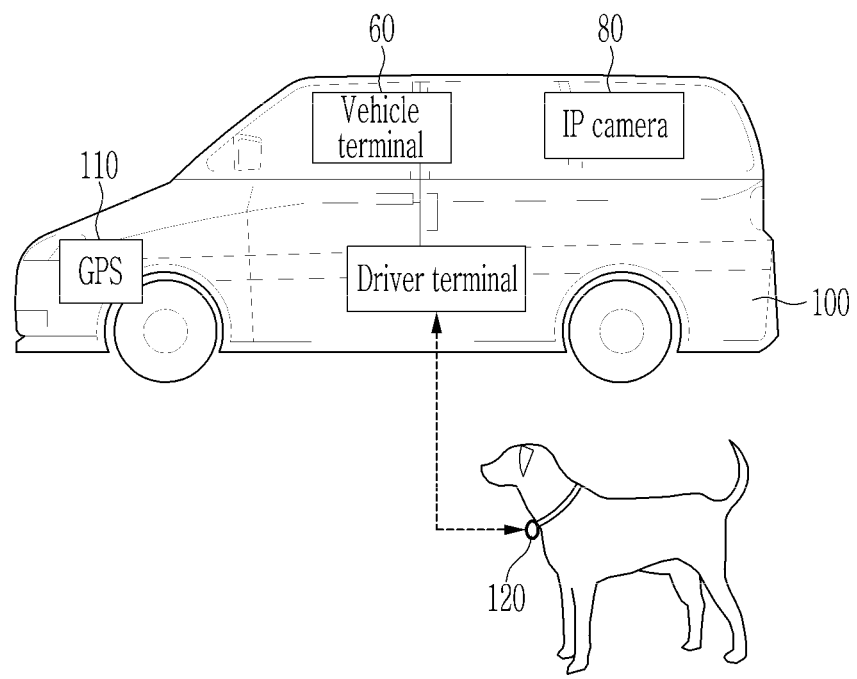
FIG. 12 is a diagram schematically illustrating pet mobility according to an embodiment.

FIG. 12 is a diagram schematically illustrating pet mobility according to an embodiment.

As shown in FIG. 12, the vehicle 100 as an example of pet mobility may further include a Global Positioning System (GPS) 110. The GPS 110 derives location information on the current location of the vehicle 100 and transmits the current location information of the vehicle 100 to the vehicle control server 30.

In the embodiment shown in FIG. 12, the driver terminal 70 may be used as a recognition means for identifying the pet boarding the vehicle 100. However, the invention is not limited thereto, and a separate recognition means may be provided in the vehicle 100.

When the vehicle 100 moves, the IP camera 80 may be configured to photograph or video of the pet and transmit the photograph image or videos of pet to the management server 10. Hereinafter, a pet image may indicate the photographed image or videos of pet.

The driver terminal 70 may be configured to read the pet identification information recorded in the identification device 120 provided to the pet in order to recognize the pet. Pet identification information may be registered in advance in the management server 10 through the user terminal 20. The pet identification information may be a unique identification number assigned to the companion animal. When a user subscribes to a pet care service site managed by the management server 10, the user terminal 20 may be configured to register pet identification information and user information in the management server 10. The management server 10 may be configured to match and store user information and pet identification information.

When the pet boards the vehicle 100, the driver may read the pet identification device 120 using the driver terminal 70 and obtain pet identification information. The pet identification information recorded in the identification device 120 may be a serial number assigned to each of a plurality of registered pets. The management server 10 may be configured to store the pet's gender, birth date, adoption date, medical history, allergy, biometric information, etc. linked to the pet identification information.

A recognition app for reading pet identification information from the identification device 120 may be installed in the driver terminal 70. The driver terminal 70 may be configured to read the pet identification information from the identification device 120 through a tagging method such as NFC through an installed app. Alternatively, the driver terminal 70 may be configured to read the pet identification information from the identification device 120 in a non-tagging method such as a QR code, a BAR code, or Bluetooth through an installed app.

Alternatively, the identification device 120 may be a recognition device in which a unique identification number for identifying a pet is written as pet identification information, and the driver may input a unique identification number written in the identification device 120 to the driver terminal 70.

The driver terminal 70 may be configured to transmit the read pet identification information to the management server 10. Then, the management server 10 may be configured to determine whether the pet boarding the vehicle 100 is identical to the target of the reserved pet care service. The management server 10 may be configured to compare the pet identification information matched with the user who reserved the pet care service with the pet identification information received from the driver terminal 70 to determine whether they are identical.

The management server 10 may be configured to request information on the current location of the vehicle 100 from the vehicle control server 30, and the vehicle control server 30 may be configured to transmit information on the current location of the vehicle 100 to the management server 10 in response to the request.

When the pet travels alone, if the pet boarding the vehicle 100 is a pet subject to the pet care service, the management server 10 may be configured to combine the current location information of the vehicle 100 and the image captured by the IP camera 80 and transmit to the user terminal 20 while the vehicle 100 moves from the pet transport departure to the pet transport destination. In addition, when the pet travels alone in return pickup, while the vehicle 100 moves from the pet transport destination to the pet transport departure (or other place), the management server 10 may be configured to combine the current location information of the vehicle 100 and the image captured by the IP camera 80 and transmit to the user terminal 20.

In addition, when the pet boards the vehicle 100, the management server 10 may be configured to determine that the received pet identification information is identical to the pet identification information matched to the user who reserved the pet care service, based on the pet identification information, the vehicle 100 may be configured to identify a pet boarding the vehicle, derive environmental information necessary to provide a vehicle environment suitable for the identified pet from the registered data, and transmit the derived environment information to the vehicle terminal 60. The environment information may include information about suitable temperature, humidity, music, etc. according to the type of pet. The vehicle terminal 60 may be configured to receive environmental information, and the vehicle may adjust the temperature, humidity, music, etc. of the vehicle according to the environmental information.

Figure 13:
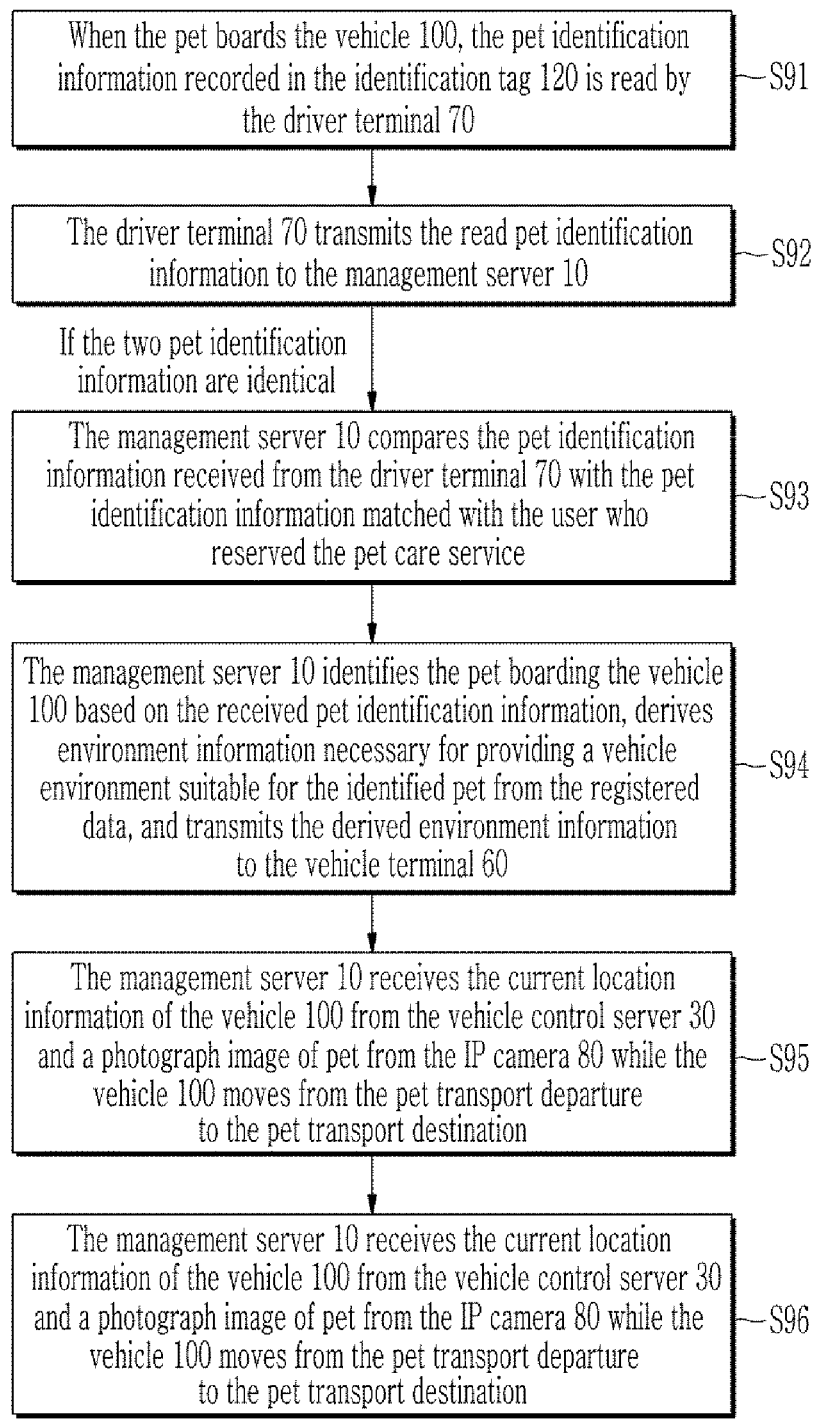
FIG. 13 is a flowchart of a pet care service method according to an embodiment.

FIG. 13 is a flowchart of a pet care service method according to an embodiment.

After the pet transport service or the total service is reserved, a pet care service method after the vehicle dispatched by the management server 10 arrives at a pet transport departure point will be described with reference to FIG. 13.

When the pet boards the vehicle 100, the pet identification information recorded in the identification device 120 is read by the driver terminal 70 (S91).

The driver terminal 70 may be configured to transmit the read pet identification information to the management server 10 (S92).

The management server 10 may be configured to compare the pet identification information received from the driver terminal 70 with the pet identification information matched with the user who reserved the pet care service (S93).

As a result of the comparison in step S93, if the two pet identification information are identical, the management server 10 may be configured to identify the pet boarding the vehicle 100 based on the received pet identification information, derive environment information necessary for providing a vehicle environment suitable for the identified pet from the registered data, and transmit the derived environment information to the vehicle terminal 60 (S94).

As a result of the comparison in step S93, if the two pet identification information are identical, the management server 10 may be configured to receive the current location information of the vehicle 100 from the vehicle control server 30 and a pet image of pet from the IP camera 80 while the vehicle 100 moves from the pet transport departure to the pet transport destination (S95).

While the vehicle 100 moves from the pet transport destination to the pet transport destination, the management server 10 may be configured to combine the current location information of the vehicle 100 and the pet image of pet, and transmit the combined information to the user terminal 20 (S96).

As a result of the comparison in step S93, when the two pet identification information are not identical. The management server 10 may be configured to transmit to the user terminal 20 and the driver terminal 70 that the two pet identification information are not identical. The user may recognize that the two pet identification information are not identical through the user terminal 20 and take necessary measures.

Figure 14:
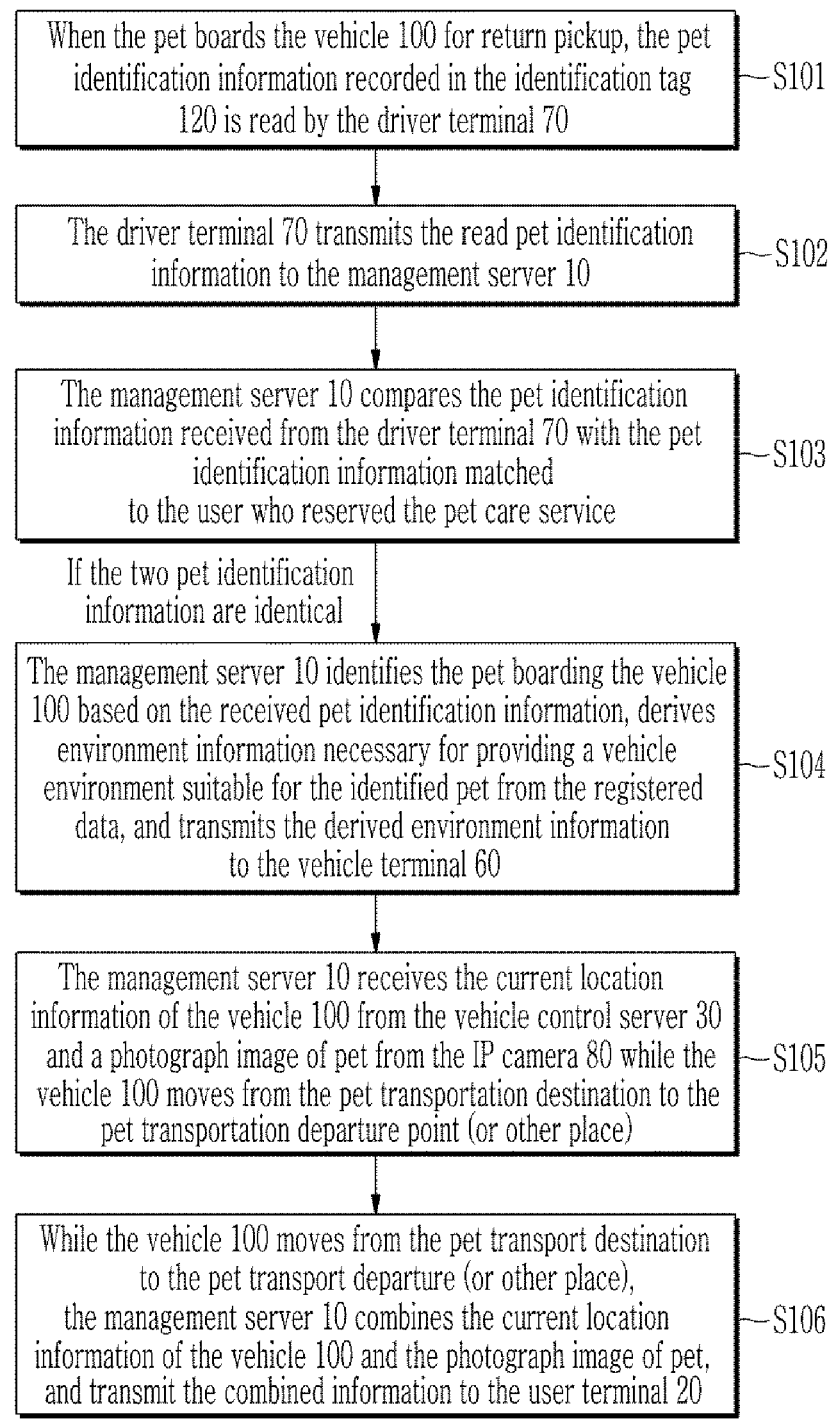
FIG. 14 is a flowchart of a pet care service method according to an embodiment.

FIG. 14 is a flowchart of a pet care service method according to an embodiment.

When return pickup is included in the reserved pet transport service or total service, a pet care service method after the vehicle dispatched by the management server 10 arrives at the pet transport destination will be described with reference to FIG. 14.

When the pet boards the vehicle 100 for return pickup, the pet identification information recorded in the identification device 120 is read by the driver terminal 70 (S101).

The driver terminal 70 may be configured to transmit the read pet identification information to the management server 10 (S102).

The management server 10 may be configured to compare the pet identification information received from the driver terminal 70 with the pet identification information matched to the user who reserved the pet care service (S103).

As a result of the comparison in step S103, if the two pet identification information are identical, the management server 10 may be configured to identify the pet boarding the vehicle 100 based on the received pet identification information, derive environment information necessary for providing a vehicle environment suitable for the identified pet from the registered data, and transmit the derived environment information to the vehicle terminal 60 (S104).

As a result of the comparison in step S103, if the two pet identification information are identical, the management server 10 may be configured to receive the current location information of the vehicle 100 from the vehicle control server 30 and a pet image of pet from the IP camera 80 while the vehicle 100 moves from the pet transportation destination to the pet transportation departure point (or other place) (S105).

While the vehicle 100 moves from the pet transport destination to the pet transport departure (or other place), the management server 10 may be configured to combine the current location information of the vehicle 100 and the pet image of pet, and transmit the combined information to the user terminal 20 (S106).

If the reserved pet care service is a medical service, while the pet is moving to the hospital (service partner) which is the pet transport destination, the pet image of pet will be transmitted to the partner terminal (40_j, j is one of the natural numbers from 1 to n).

Hereinafter, a method in which a pet image of pet is used for a medical service will be described with reference to FIG. 15.

Figure 15:
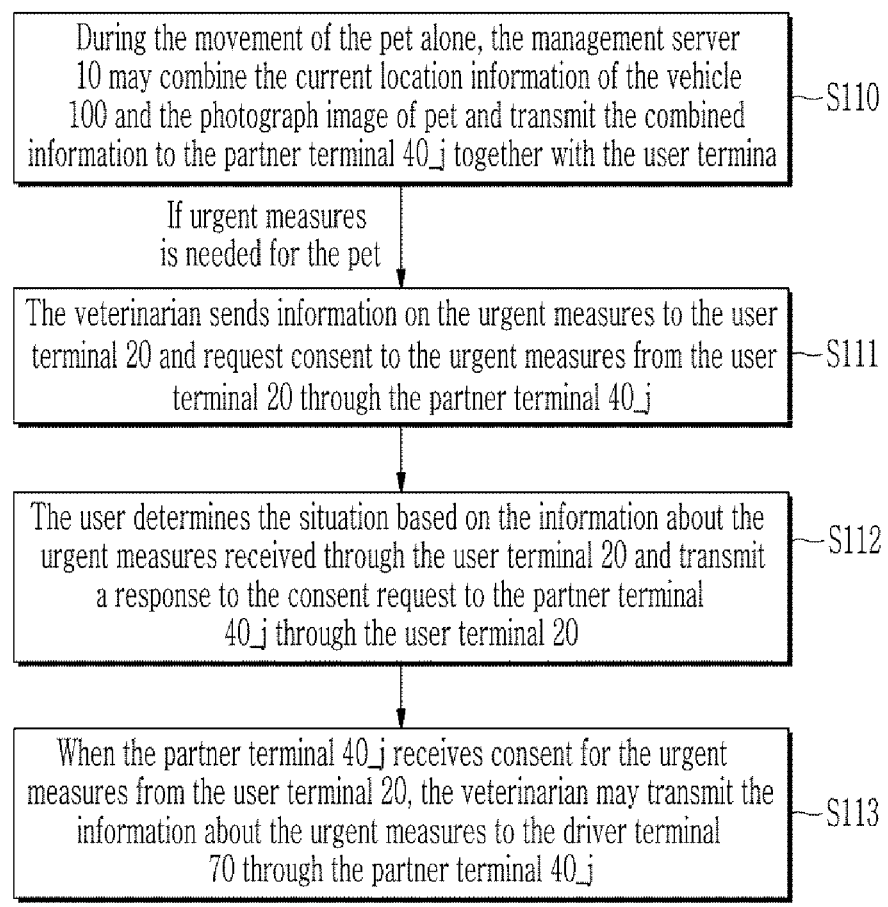
FIG. 15 is a flowchart illustrating a medical service using a pet image according to an embodiment.

FIG. 15 is a flowchart illustrating a medical service using a pet image according to an embodiment.

During the movement of the pet alone, the management server 10 may be configured to combine the current location information of the vehicle 100 and the pet image of pet and transmit the combined information to the partner terminal 40_j together with the user terminal 20 (S110).

The veterinarian of the service partner may be configured to diagnose the state of the pet through the pet image of pet received through the partner terminal 40_j. While the pet moves by the vehicle 100, the veterinarian may prepare a necessary procedure based on the diagnosis result. Since the partner terminal 40_j receives the current location information of the vehicle 100 from the management server 10 together with the pet image of pet, it may be configured to estimate a time of arrival by considering the routes between the service partner and the current location of the vehicle 100 and the traffic conditions of the routes.

If urgent measures is needed for the pet, the veterinarian may transmit information on the urgent measures to the user terminal 20 and request consent to the urgent measures from the user terminal 20 through the partner terminal 40_j (S111). The urgent measures are measures that may be implemented by the general public who are non-professionals, and if not implemented immediately, it may be fatal to the life of the pet.

The user may determine the situation based on the information about the urgent measures received through the user terminal 20 and transmit a response to the consent request to the partner terminal 40_j through the user terminal 20 (S112).

When the partner terminal 40_j receives consent for the urgent measures from the user terminal 20, the veterinarian may transmit the information about the urgent measures to the driver terminal 70 through the partner terminal 40_j (S113).

The driver may park the vehicle 100 at a place where the vehicle 100 may be parked and stopped, and may take measures related to the pet according to the information about the urgent measures received through the driver terminal 70. For example, when the pet's breathing stops or the airway is blocked, the veterinarian transmits a specific method for CPR or Heimleak method to the driver terminal 70 through the partner terminal 40_i, or through a real-time video call between the partner terminal 40_i and the driver terminal 70, the veterinarian may inform the driver of the CPR or Heimleak method.

Figure 16:
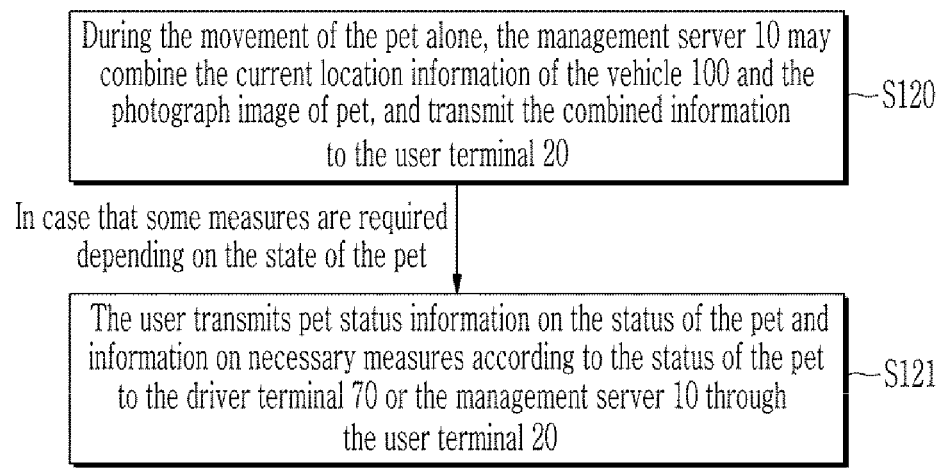
FIG. 16 is a flowchart illustrating a pet care service using a pet image of pet according to an embodiment.

FIG. 16 is a flowchart illustrating a pet care service using a pet image of pet according to an embodiment.

During the movement of the pet alone, the management server 10 may be configured to combine the current location information of the vehicle 100 and the pet image of pet, and transmit the combined information to the user terminal 20 (S120).

The user may see the pet image of pet received through the user terminal 20 to know the state of the pet. For example, the user may know the state of the pet according to the pet's facial expression, behavior, tail movement, and sound. Specifically, if the pet shows the behavior of rolling its tail and putting it between its legs, the user may know that the pet is frightened.

Some measures may be required depending on the state of the pet determined by the user after viewing the pet image of the pet. In particular, the user may transmit pet status information on the status of the pet and information on necessary measures according to the status of the pet to the driver terminal 70 or the management server 10 through the user terminal 20 (S121).

The driver may park the vehicle 100 at a place where the vehicle 100 can be parked and stopped, and may take measures on the pet according to the information on necessary measures received through the driver terminal 70.

The content described in this disclosure does not limit the application of the techniques not described to the present invention. That is, the presently known technologies and the present invention may be combined to provide a new service, and the contents described in the present disclosure do not limit this. Various types of pet mobility solutions may be provided through linkage between the pet care service and the pet mobility service described according to the exemplary embodiment.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: pet care system
10: pet care management server
20: user terminal
30: vehicle control server
40_1-40_n: partner terminal
50: pet mobility
60: vehicle terminal
70: driver terminal
80: IP camera
90: pet medical integration server

What is claimed is:

1. A pet care service system using pet mobility to provide a pet care service reserved by a user terminal, comprising:
a recognizer configured to obtain pet identification information for identifying a pet by reading an identification device attached to the pet boarding the pet mobility;
a camera provided in the pet mobility to photograph or video the pet to generate a pet image of the pet boarding the pet mobility; and
a management server configured to:
receive the pet identification information from the recognizer,
compare the received pet identification information with pet identification information matched to a user of the user terminal, combine current location information of the pet mobility with a pet image of the pet boarding the pet mobility received from the camera when the received pet identification information and the pet identification information matched to the user are identical,
transmit the combined information to the user terminal,
derive environmental information necessary to provide an environment suitable for the pet identified from registered data when the pet identification information matched to the user and the received pet identification information are identical at a time when the pet boards, and
transmit the derived environmental information to a terminal of the pet mobility,
wherein the environmental information includes information about at least one of suitable temperature, humidity, or music according to a type of the pet, and
wherein the terminal of the pet mobility is configured to receive the environmental information and adjust the pet mobility according to the environmental information.

2. The pet care service system according to claim 1, wherein the pet mobility is configured to transmit the current location information to a vehicle control server, and the management server is configured to receive the current location information from the vehicle control server.

3. The pet care service system according to claim 1, wherein the recognizer is a driver terminal of a driver operating the pet mobility, and the pet identification information is read from the identification device through an app installed in the driver terminal.

4. The pet care service system according to claim 1, wherein the recognizer is a driver terminal of a driver operating the pet mobility, and the pet identification information written in the identification device is transmitted to the management server through the driver terminal.

5. The pet care service system according to claim 1, further comprising a driver terminal of a driver operating the pet mobility,
    wherein at least one of the management servers and the driver terminal are configured to receive status information about the pet and information about measures required for the pet from the user terminal.

6. A pet care service method using pet mobility to provide a pet care service reserved by a user terminal, comprising:
    reading, by a recognizer, pet identification information of the pet from an identification device attached to the pet when the pet boards the pet mobility;
    comparing, by a management server, the pet identification information received from the recognizer with the pet identification information matched to a user of the user terminal;
    receiving, by the management server, a pet image of the pet from a camera installed in the pet mobility pet when the pet identification information received from the recognizer and the pet identification information matched to the user are identical;
    combining, by the management server, current location information of the pet mobility and the pet image of the pet;
    transmitting, by the management server, the combined information to the user terminal;
    deriving, by the management server, environmental information necessary to provide an environment suitable for the pet identified from registered data when the pet identification information matched to the user and the received pet identification information are identical at a time which the pet boards the pet mobility;
    transmitting, by the management server, the derived environmental information to a terminal of the pet mobility;
    receiving, by the pet mobility terminal, the environmental information; and
    adjusting the pet mobility according to the environmental information,
    wherein the environmental information includes information about at least one of suitable temperature, humidity, or music according to a type of the pet.

7. The pet care service method according to claim 6, further comprising:
    transmitting, by the pet mobility, the current location information to a vehicle control server; and
    receiving, by the management server, the current location information from the vehicle control server.

8. The pet care service method according to claim 6, wherein the recognizer is a driver terminal of a driver operating the pet mobility, further comprising:
    reading, by an application installed in the driver terminal, the pet identification information from the identification device.

9. The pet care service method according to claim 6, wherein the recognizer is a driver terminal of a driver operating the pet mobility, further comprising:
    receiving, by the management server, the pet identification information written in the identification device from the driver terminal.

10. The pet care service method according to claim 6, wherein the recognizer is a driver terminal of a driver operating the pet mobility, further comprising:
    receiving, by the management server, pet status information on the status of the pet and information on necessary measures according to the status of the pet from the user terminal.

\* \* \* \* \*